United States Patent
Kato et al.

(10) Patent No.: US 9,258,443 B2
(45) Date of Patent: Feb. 9, 2016

(54) IMAGE FORMING APPARATUS REMOTELY OPERATED BY EXTERNAL TERMINAL, IMAGE FORMING SYSTEM INCLUDING THE SAME, AND RECORDING MEDIUM

(71) Applicant: Konica Minolta, Inc., Chiyoda-ku (JP)

(72) Inventors: Tomokazu Kato, Toyokawa (JP); Jun Kunioka, Okazaki (JP); Koichi Amiya, Kawaguchi (JP); Yukina Hisada, Toyokawa (JP); Hiroshi Murakami, Toyokawa (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 14/091,857

(22) Filed: Nov. 27, 2013

(65) Prior Publication Data
US 2014/0146366 A1    May 29, 2014

(30) Foreign Application Priority Data

Nov. 29, 2012  (JP) .................................. 2012-260575

(51) Int. Cl.
*G06F 3/12*   (2006.01)
*H04N 1/00*   (2006.01)

(52) U.S. Cl.
CPC ......... *H04N 1/00466* (2013.01); *H04N 1/0049* (2013.01); *H04N 1/00474* (2013.01); *H04N 1/00477* (2013.01); *H04N 1/00482* (2013.01); *H04N 2201/0072* (2013.01); *H04N 2201/0075* (2013.01); *H04N 2201/0094* (2013.01)

(58) Field of Classification Search
USPC ................................................ 358/1.14, 1.1
See application file for complete search history.

(56) References Cited

U.S. PATENT DOCUMENTS

| 2006/0290680 A1 | 12/2006 | Tanaka et al. |
| 2007/0109561 A1 | 5/2007 | Suzue |
| 2007/0201107 A1* | 8/2007 | Ando et al. ................... 358/468 |

(Continued)

FOREIGN PATENT DOCUMENTS

| JP | 05-122424 A | 5/1993 |
| JP | 2007-043647 A | 2/2007 |

(Continued)

OTHER PUBLICATIONS

Office Action (Notice of Reasons for Refusal) issued on Oct. 7, 2014, by the Japan Patent Office in corresponding Japanese Patent Application No. 2012-260575, and an English Translation of the Office Action. (8 pages).

(Continued)

*Primary Examiner* — Martin Mushambo
(74) *Attorney, Agent, or Firm* — Buchanan Ingersoll & Rooney PC

(57) ABSTRACT

An image forming apparatus which can be remotely operated by an external terminal comprises a touch panel for displaying various information and receiving an operation input from an operator, a status detection part for detecting an apparatus status of the image forming apparatus, a status display part provided separately from the touch panel, for displaying the apparatus status detected by the status detection part, a generation part for generating data of a first image representing a display content on the touch panel and a second image representing a display content on the status display part, and a transmitting part for transmitting the data of the first and second images to the external terminal as display data for a remote operation screen on the external terminal.

22 Claims, 18 Drawing Sheets

(56) References Cited

U.S. PATENT DOCUMENTS

2008/0278748 A1 11/2008 Akahane et al.
2012/0013928 A1* 1/2012 Yoshida et al. .............. 358/1.13
2014/0146366 A1 5/2014 Kato et al.

FOREIGN PATENT DOCUMENTS

| JP | 2007-110617 A | 4/2007 |
| JP | 2007-140756 A | 6/2007 |
| JP | 2008-233482 A | 10/2008 |
| JP | 2008-283437 A | 11/2008 |
| JP | 2009-223536 A | 10/2009 |
| JP | 2011-257887 | 12/2011 |
| JP | 2014-104685 A | 6/2014 |

OTHER PUBLICATIONS

Examiner's Decision to Grant a Patent issued in corresponding Japanese Patent Application No. 2012-260575; mailed Feb. 17, 2015, and English translation thereof. 6 pages.

* cited by examiner

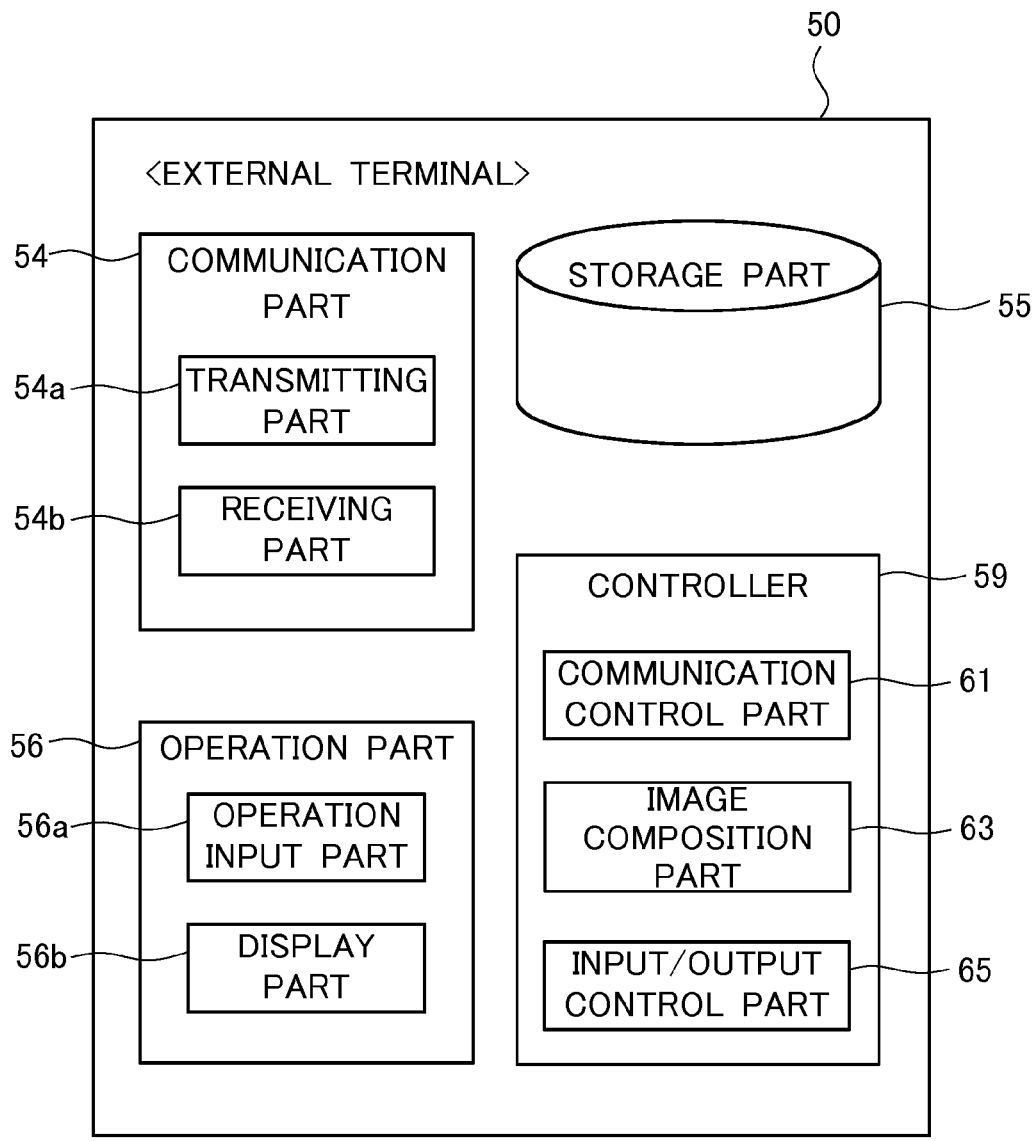

IMAGE FORMING APPARATUS REMOTELY OPERATED BY EXTERNAL TERMINAL, IMAGE FORMING SYSTEM INCLUDING THE SAME, AND RECORDING MEDIUM

This application is based on Japanese Patent Application No. 2012-260575 filed on Nov. 29, 2012, the contents of which are hereby incorporated by reference.

BACKGROUND OF THE INVENTION

1. Field of the Invention

The present invention relates to an image forming system, and a technique relevant thereto.

2. Description of the Background Art

There have been systems (image forming systems or remote operation (remote control) systems) in each of which an image forming apparatus is remotely operated by an external terminal. In such a system, a remote operation screen is displayed on a display part of the external terminal, and an apparatus to be operated is remotely operated by using the remote operation screen. Japanese Patent Application Laid Open Gazette No. 2007-110617 (Patent Document 1), for example, discloses a technique in which a remote operation screen simulating a display screen on a display of an image forming apparatus is displayed on a display part of a port terminal (external terminal) connected to the image forming apparatus.

In each of many image forming apparatuses, a touch panel is provided in an operation panel thereof and an operation input is given to the touch panel by a user. Further, in some of the image forming apparatuses, besides the touch panel, a display part showing an apparatus status is further provided. For example, provided is a "data reception LED" indicating that print data from another computer (print instruction apparatus) is being received, or the like.

If the user knows that the data reception LED is lit up in the image forming apparatus, the user can respond to such a condition as circumstances demand. For example, the user who knows the lighting of the data reception LED can know that the print output made by another user will be performed, following the data reception, in the image forming apparatus prior to his (her) copy job. Therefore, considering that there is a good possibility that the start of his own copy job or the like will be delayed due to the antecedent print output, the user can perform his copy job by using another image forming apparatus.

In some cases, a user using such a remote operation system as discussed above remotely operates an image forming apparatus by using an external terminal in a place where the user cannot see the image forming apparatus itself.

In the technique disclosed in Patent Document 1 discussed above, however, only an image (simulated image) representing a display content on a touch panel of the image forming apparatus is displayed on the display part of the external terminal, and no information on the "data reception LED" or the like (information on a display part other than the touch panel) is displayed on the display part of the external terminal. Therefore, a user cannot know any information on the display part other than the touch panel and it is difficult for the user to take some measures such as performing a copy operation by using another image forming apparatus, or the like.

SUMMARY OF THE INVENTION

It is an object of the present invention to provide a technique for allowing easy recognition of an apparatus status of an image forming apparatus in a remote operation of the image forming apparatus which is performed by using an external terminal.

The present invention is intended for an image forming apparatus which can be remotely operated by an external terminal. According to a first aspect of the present invention, the image forming apparatus comprises a touch panel for displaying various information and receiving an operation input from an operator, a status detection part for detecting an apparatus status of the image forming apparatus, a status display part provided separately from the touch panel, for displaying the apparatus status detected by the status detection part, a generation part for generating data of a first image representing a display content on the touch panel and a second image representing a display content on the status display part, and a transmitting part for transmitting the data of the first and second images to the external terminal as display data for a remote operation screen on the external terminal.

The present invention is also intended for a non-transitory computer-readable recording medium. According to a second aspect of the present invention, the non-transitory computer-readable recording medium records therein a computer program to be executed by a computer embedded in an image forming apparatus which can be remotely operated by an external terminal, to cause the computer to perform the steps of a) detecting an apparatus status of the image forming apparatus, b) displaying the apparatus status detected in the step a), on a status display part provided in the image forming apparatus separately from a touch panel, and c) transmitting data of a first image representing a display content on the touch panel and a second image representing a display content on the status display part to the external terminal as display data for a remote operation screen on the external terminal.

The present invention is still also intended for an image forming system. According to a third aspect of the present invention, the image forming system comprises an image forming apparatus and an external terminal for remotely operating the image forming apparatus by using a remote operation screen, and in the image forming system of the present invention, the image forming apparatus has a touch panel for displaying various information and receiving an operation input from an operator, a status detection part for detecting an apparatus status of the image forming apparatus, a status display part provided separately from the touch panel, for displaying the apparatus status detected by the status detection part, and a transmitting part for transmitting data of a first image representing a display content on the touch panel and a second image representing a display content on the status display part to the external terminal as display data for a remote operation screen on the external terminal, and the external terminal has a receiving part for receiving the data of the first and second images, a display part for displaying the remote operation screen thereon, and a control part for controlling the remote operation screen to be displayed on the display part on the basis of the data of the first and second images.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a flowchart showing a retransmission operation for retransmitting the remote operation screen to the external terminal, and the like;

FIG. 18 is a functional block diagram showing a schematic constitution of an external terminal in accordance with the second preferred embodiment.

DESCRIPTION OF THE PREFERRED EMBODIMENTS

Hereinafter, with reference to figures, discussion will be made on the preferred embodiments of the present invention.

1. The First Preferred Embodiment

1-1. Overall Configuration

Figure 1:
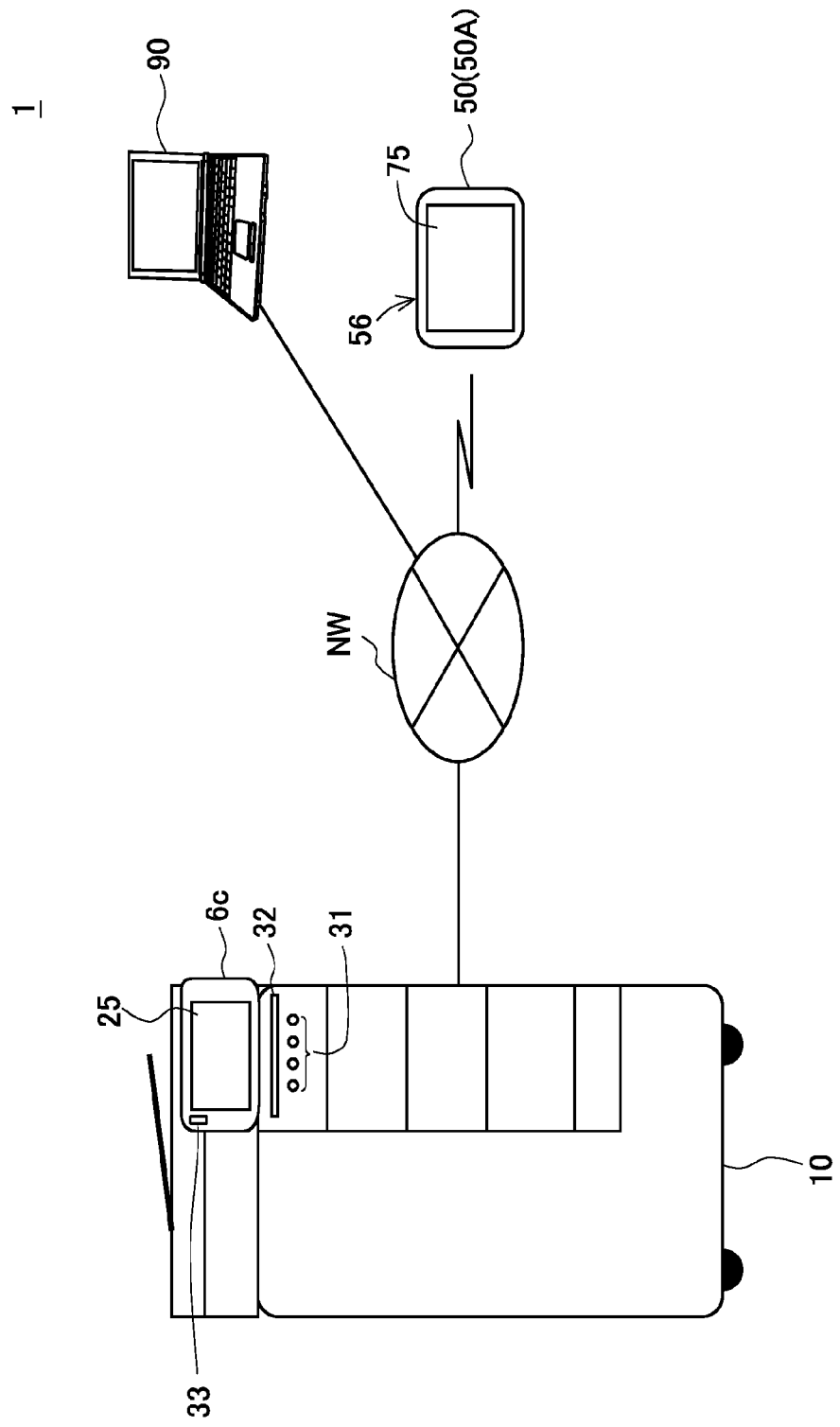
FIG. 1 is a view showing an image forming system in accordance with a first preferred embodiment of the present invention.

FIG. 1 is a view showing an image forming system 1 (also referred to as 1A) in accordance with the first preferred embodiment of the present invention. As shown in FIG. 1, the image forming system 1A comprises an image forming apparatus 10 (also referred to as 10A), an external terminal 50 (also referred to as 50A), and a computer 90.

The image forming apparatus 10, the external terminal 50, and the computer 90 are connected to one another via a network NW. The network NW includes a LAN (Local Area Network), the internet, and the like. The connection between each of the devices and the network NW may be a wired connection or a wireless connection. There is a case, for example, where the image forming apparatus 10 and the computer 90 are connected to the network NW via wired communication and the external terminal 50 is connected to the network NW via wireless communication.

In the image forming system 1, various operations on the image forming apparatus 10 can be performed by using the external terminal 50. In other words, the external terminal 50 is capable of remotely operating the image forming apparatus 10. Further, the image forming system 1 is also referred to as a remote operation (remote control) system for remotely operating the image forming apparatus 10.

1-2. Constitution of Image Forming Apparatus 10

Figure 2:
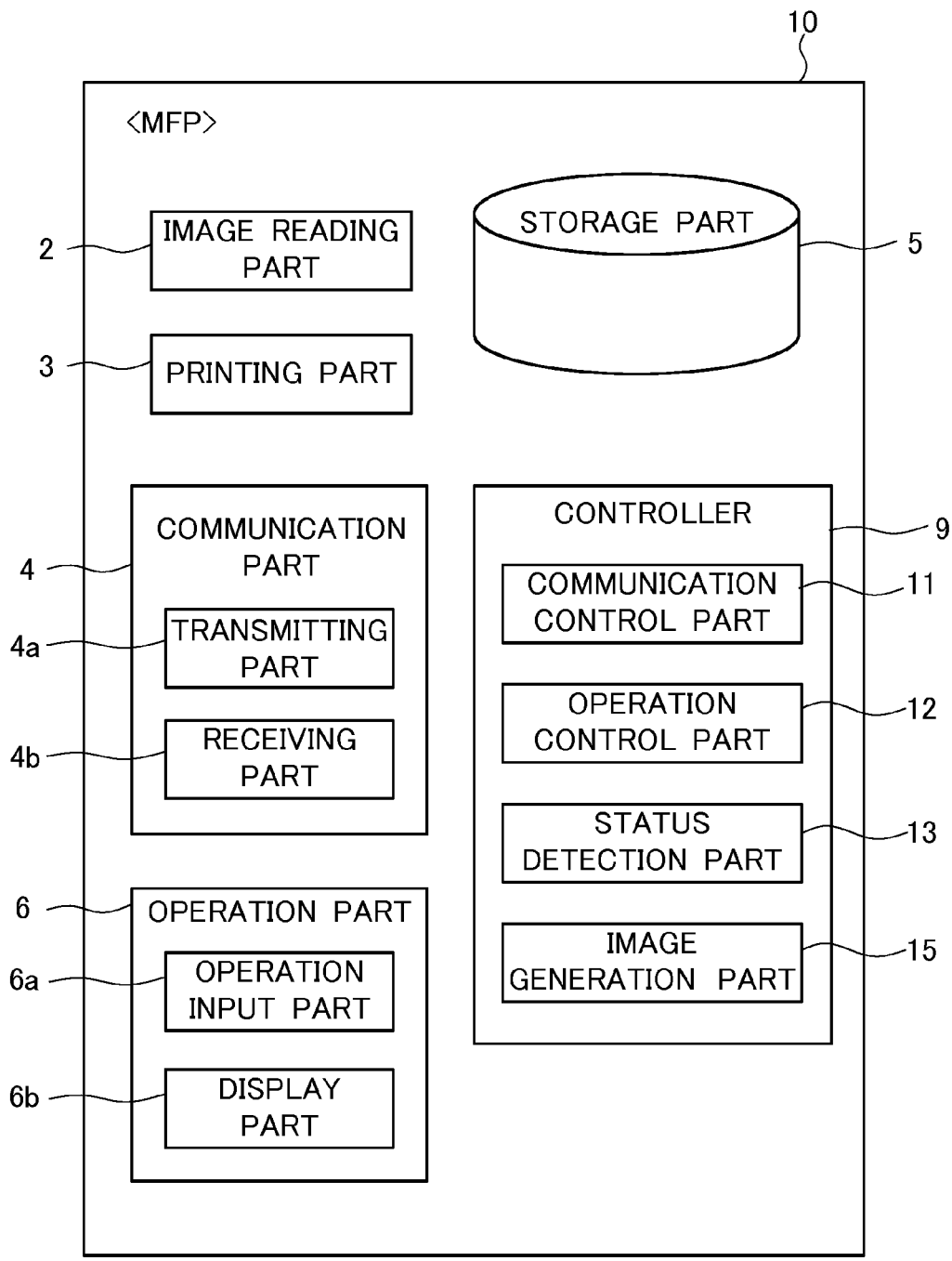
FIG. 2 is a view showing function blocks of an MFP (image forming apparatus)

FIG. 2 is a view showing function blocks of the image forming apparatus 10. Herein, as an example of the image forming apparatus 10, shown is an MFP (Multi-Functional Peripheral). FIG. 2 shows function blocks of an MFP 10.

The MFP 10 is an apparatus (also referred to as a multi-function machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an operation part 6, a controller 9, and the like and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network NW. The network communication uses various protocols such as TCP/IP (Transmission Control Protocol/Internet Protocol) and the like. By using the network communication, the MFP 10 can transmit and receive various data to/from desired partners (for example, the external terminal 50). The communication part 4 has a transmitting part 4a for transmitting various data and a receiving part 4b for receiving various data.

The storage part 5 is a storage unit such as a hard disk drive (HDD) or/and the like. The storage part 5 stores therein data relevant to printing jobs.

The operation part 6 comprises an operation input part 6a for receiving an input which is given to the MFP 10 and a display part 6b for displaying various information thereon.

The MFP 10 is provided with a substantially plate-like operation panel part 6c (see FIG. 1). The operation panel part 6c has a touch screen 25 (see FIG. 1) on a front surface side thereof. The touch panel 25 is a liquid crystal display panel in which a piezoelectric sensor or the like is embedded, and capable of displaying various information thereon and receiving the operation input from an operator. In the touch screen 25, for example, displayed is a menu image (including button images and the like). By pressing buttons which are virtually arranged in the touch screen 25 (which are represented by the button images), the operator can set various operations of the image forming apparatus 10, or the like. The touch screen 25 serves as part of the operation input part 6a and also serves as part of the display part 6b.

Further, in the MFP 10, provided with a display part (hereinafter, referred to also as a status display part) for displaying thereon an apparatus status (the status of the MFP 10) detected by a status detection part 13 (described later). The status display part is a display part which is provided separately from the touch panel 25. Part of the status display part is provided on a surface of the operation panel part 6c and the other part of the status display part is provided outside the operation panel part 6c. The status display part has three LED display parts (display parts each using an LED (light emitting diode)) 31, 32, and 33.

The LED display part 31 includes a plurality of (four, in this case) LEDs which are embedded in a left-and-right direction in a body front surface portion of the MFP 10 (and outside the operation panel part 6c provided on the body front surface side of the MFP 10). The LED display part 31 is arranged below the touch panel 25. The LED display part 31 is a display part for indicating whether or not the MFP 10 is receiving data (i.e., in a data reception state) and also referred to as a data reception display part (or data reception LED) or the like. The LED display part 31 is also a notification part for notifying that the MFP 10 is brought into the data reception state. When the MFP 10 is in the data reception state, the LED display part 31 is lit up in blue. On the other hand, when the MFP 10 is not in the data reception state, the LED display part 31 is turned off. The "data reception state" includes a state where unprocessed data is being received (unprocessed data being-received state), a state where unprocessed data has been received (unprocessed data has-been-received state), and the like.

The LED display part 32 has a slim rectangular shape extending in the left-and-right direction and provided near and above the LED display part 31. Specifically, the LED display part 32 includes a plurality of LEDs which are embedded in a body front surface portion of the MFP 10 (and outside the operation panel part 6c) and a diffusion plate provided on a front side of the plurality of LEDs. The LED display part 32 is a display part for indicating whether or not the MFP 10 is operating (during print operation, in this case) and also referred to as an operating-state display part (or operating-state LED) or the like. The LED display part 32 is also a notification part for notifying that the MFP 10 is brought into an operation state (print operation state). When the MFP 10 is in the print operation state, the LED display part 32 is lit up in white. On the other hand, when the MFP 10 is not in the print operation state, the LED display part 32 is turned off.

The LED display part 33 is provided at an upper-left portion in the operation panel part 6c of the MFP 10. The LED display part 33 includes an LED which is embedded in the upper-left portion of the operation panel part 6c and a diffusion plate provided on a front side of the LED. The LED display part 33 is a display part for indicating whether or not the MFP 10 is in an attention state (cautionary state) and also referred to as an attention display part (or attention LED) or the like. The LED display part 33 is also a notification part for notifying that the MFP is brought into the attention state (cautionary state). When the MFP 10 is in the attention state, the LED display part 33 is lit up in orange. On the other hand, when the MFP 10 is not in the attention state, the LED display part 33 is turned off. The "attention state" refers to a state where there is no trouble (occurs no error) yet at that point in time but there is a good possibility that an error will occur if no measures are taken, and a state where attention is required (cautionary state).

Thus, the status display part has the notification parts 31, 32, and 33 for notifying that the MFP 10 is brought into any one of three states, i.e., the data reception state, print operation state, and the attention state, respectively.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, referred to simply as a program) PG1 stored in the ROM (e.g., EEPROM), to thereby implement various processing parts. Further, the program (in more detail, a set of programs) PG1 may be installed into the MFP 10 via various portable recording media (in other words, various non-transitory computer-readable recording media) such as a USB memory or the like or via the network NW or the like.

Specifically, as shown in FIG. 2, the controller 9 executes the program PG1, to thereby implement various processing parts including a communication control part 11, an operation control part 12, a status detection part 13, and an image generation part 15.

The communication control part 11 is a processing part for controlling a communication with other apparatus(es) (the external terminal 50 or/and the like). The communication control part 11, in cooperation with the communication part 4 and the like, transmits data of both a panel image 201 (described later) indicating a display content on the touch panel 25 and an LED image 202 (described later) indicating a display content on the status display part to the external terminal 50 as display data for a remote operation screen 222 (see FIG. 4) on the external terminal 50.

The operation control part 12 controls various operations such as a printing operation, a scan operation, and the like of the image forming apparatus 10.

The status detection part 13 is a processing part for detecting an apparatus status of the MFP 10. The status detection part 13 detects the apparatus status of the MFP 10 on the basis of output values from various sensors, status data in the program PG1, and the like.

The image generation part 15 is a processing part for generating the data of both the panel image 201 and the LED image 202. The image generation part 15 generates the panel image 201, the LED image 202, and the like. The image generation part 15 further generates a composite image 210 by combining the panel image 201 and the LED image 202.

1-3. Constitution of External Terminal 50

Next, discussion will be made on a constitution of the external terminal 50 (also referred to as a remote operation (remote control) apparatus).

The external terminal 50 is a portable information input/output terminal device, which is capable of performing network communication with other apparatuses. Herein, as an example of the external terminal 50, shown is a tablet terminal. The external terminal 50, however, is not limited to this but may be a smartphone, a personal computer, or the like. Further, the external terminal 50 may be a portable device or a stationary device.

Figure 3:
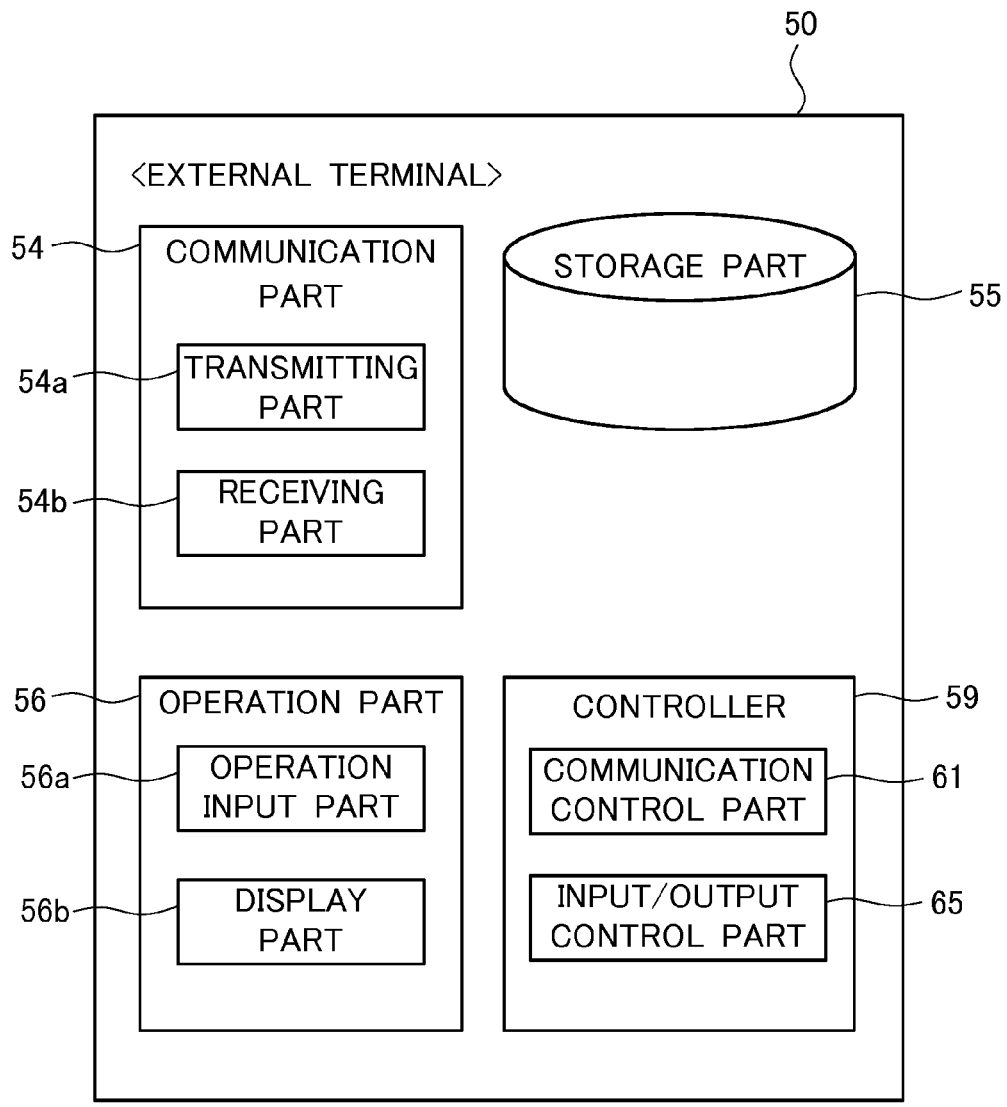
FIG. 3 is a functional block diagram showing a schematic constitution of an external terminal.

FIG. 3 is a functional block diagram showing a schematic constitution of the external terminal 50.

As shown in the functional block diagram of FIG. 3, the external terminal 50 comprises a communication part 54, a storage part 55, an operation part 56, a controller 59, and the like and multiply uses these constituent parts to implement various functions.

The communication part 54 is capable of performing network communication via the network NW. The network communication uses various protocols such as TCP/IP (Transmission Control Protocol/Internet Protocol) and the like. By using the network communication, the external terminal 50 can transmit and receive various data to/from desired partners (the image forming apparatus 10 or/and the like). The communication part 54 has a transmitting part 54a for transmitting various data and a receiving part 54b for receiving various data. For example, the receiving part 54b receives the display data for the remote operation screen (screen for remote operation) 222 from the MFP 10 and the transmitting part 54a transmits information (operation input information) on an operation input to the remote operation screen 222 displayed on a touch panel 75 (described later), and the like, to the MFP 10.

The storage part 55 is a storage unit such as a nonvolatile semiconductor memory or the like. The storage part 55 temporarily stores therein various image data (the display data for the remote operation screen 222, and/or the like) transmitted from the MFP 10.

The operation part 56 comprises an operation input part 56a for receiving an input which is given to the external terminal 50 and a display part 56b for displaying various information thereon. The external terminal 50 is provided with the touch panel 75 (see FIG. 1) which is a liquid crystal display panel in which a piezoelectric sensor or the like is embedded. The touch panel 75 serves as part of the operation input part 56a and also serves as part of the display part 56b.

As shown in FIG. 1, the external terminal 50 comprises an operation part 56 on a front surface thereof. Specifically, the touch panel 75 is provided entirely on the front surface side of the substantially plate-like external terminal 50, except a peripheral portion (frame portion) thereof.

Figure 4:
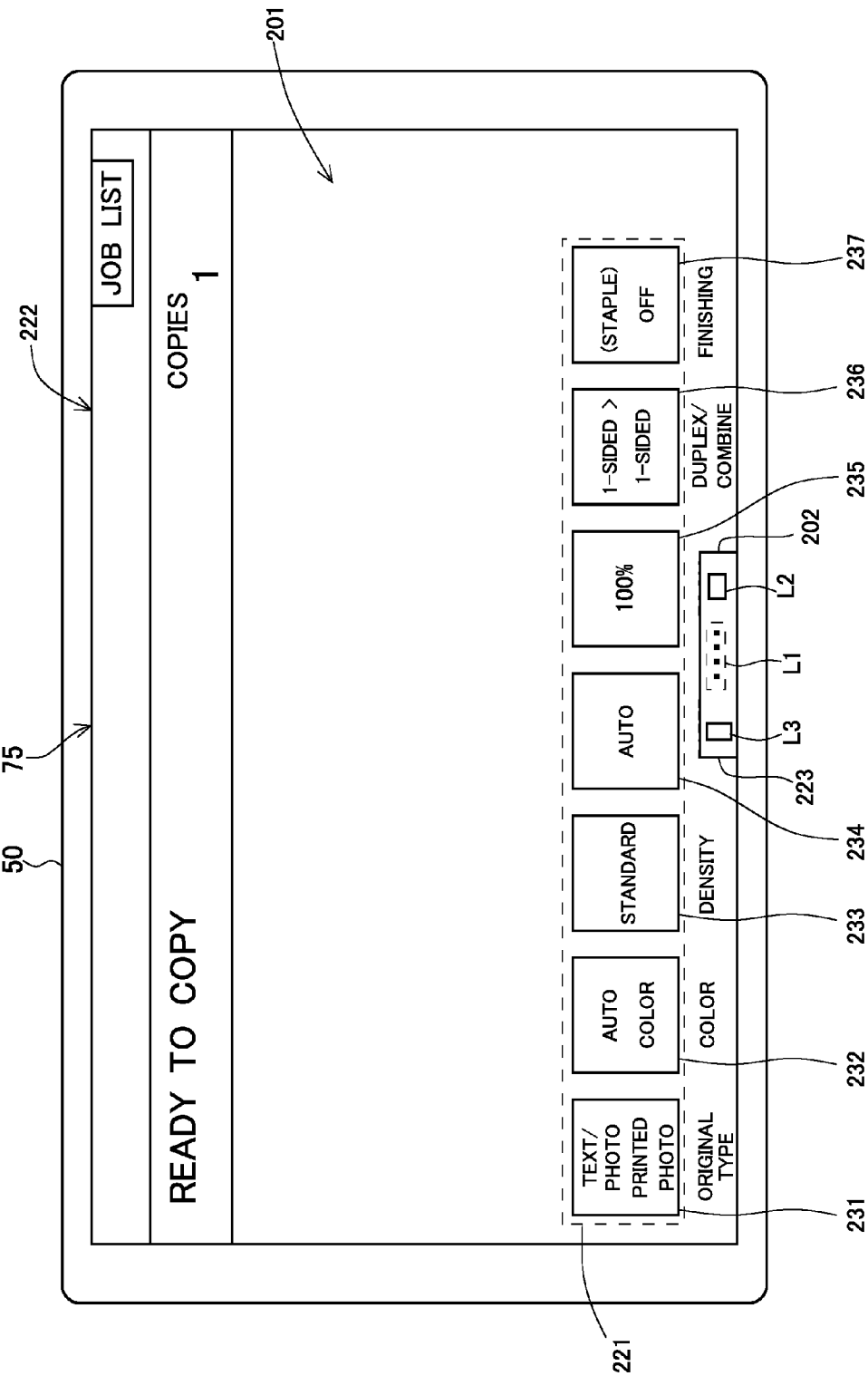
FIG. 4 is a view showing a remote operation screen on the external terminal.

FIG. 4 is a view showing a remote operation screen (a screen used for remotely operating the MFP 10) 222 displayed on the touch panel 75.

As shown in FIG. 4, on the touch panel (touch screen) 75, displayed is an image (hereinafter, referred to also as a "panel image") 201 simulating the display content on the touch panel (touch screen) 25 of the MFP 10. Further, on this touch panel 75, an image (hereinafter, referred to also as an "LED image") 202 simulating the display content on the status display part (the LED display parts 31, 32, 33) of the MFP 10 is also displayed.

Thus, on the touch panel 75, displayed is a composite image generated by combining the panel image 201 and the LED image 202. Specifically, the composite image 210 generated by superimposing the LED image 202 on the panel image 201 is displayed.

The panel image 201 has the same content as the display content on the touch panel 25. In a lower area in the panel image 201, provided are a plurality of (seven, in this case) buttons (in more detail, button images) 231 to 237. The plurality of buttons 231 to 237 are arranged in a horizontal (left-and-right) direction in a relatively lower area in the screen.

The LED image 202 is arranged in a still lower area than (below) a button area 221 where the plurality of buttons 231 to 237 are arranged. In more detail, the LED image 202 has a slim rectangular shape extending in the left-and-right direction and is arranged below the button area 221 near the center thereof in the left-and-right direction. The width (the length in the left-and-right direction) of the LED image 202 is smaller than that of the button area 221.

The LED image 202 has three display areas L1, L2, and L3. These display areas L1, L2, and L3 are provided corresponding to the three LED display parts 31, 32, and 33 of the MFP 10.

The display area L1 is an area provided corresponding to the LED display part (data reception display part) 31, indicating a display state of the data reception display part 31 of the MFP 10. The display area L1 is also referred to as a "data reception display area".

The display area L2 is an area provided corresponding to the LED display part (operating-state display part) 32, indicating a display state of the operating-state display part 32 of the MFP 10. The display area L2 is also referred to as an "operating-state display area".

The display area L3 is an area provided corresponding to the LED display part (attention display part) 33, indicating a display state of the attention display part 33 of the MFP 10. The display area L3 is also referred to as an "attention display area".

Further, discussion will be made later on the display in the touch panel 75.

Referring again to FIG. 3, the controller 59 of FIG. 3 is a control unit for generally controlling the external terminal 50. The controller 59 is a computer system which is embedded in the external terminal 50 and comprises a CPU, various semiconductor memories (RAM and ROM), and the like. The controller 59 causes the CPU to execute a predetermined software program (hereinafter, referred to simply as a program) PG2 stored in a memory part (semiconductor memory or the like), to thereby implement various processing parts. Further, the program PG2 may be installed into the external terminal 50 via various portable recording media (in other words, various non-transitory computer-readable recording media) such as a USB memory or the like or via the network NW or the like.

The program PG2 is an application software program for remote operation of the image forming apparatus 10 and used for implementing various functions and the like relevant to the remote operation.

Specifically, the controller 59 executes the program PG2, to thereby implement various processing parts including a communication control part 61 and an input/output control part 65.

The communication control part 61 is a processing part for controlling a communication with the image forming apparatus 10 and the like, in cooperation with the communication part 54 and the like.

The input/output control part 65 is a processing part for controlling the operation input of the operation input part 56a (the touch panel 75 or the like) and controlling the display operation of the display part 56b (the touch panel 75 or the like). The input/output control part 65 displays the operation image 201 and the like used for remotely operating the image forming apparatus 10, on the touch panel 75.

1-4. Operation of Controlling Status Display Part

<Outline>

Next, discussion will be made on an operation of the image forming system 1.

Figure 5:
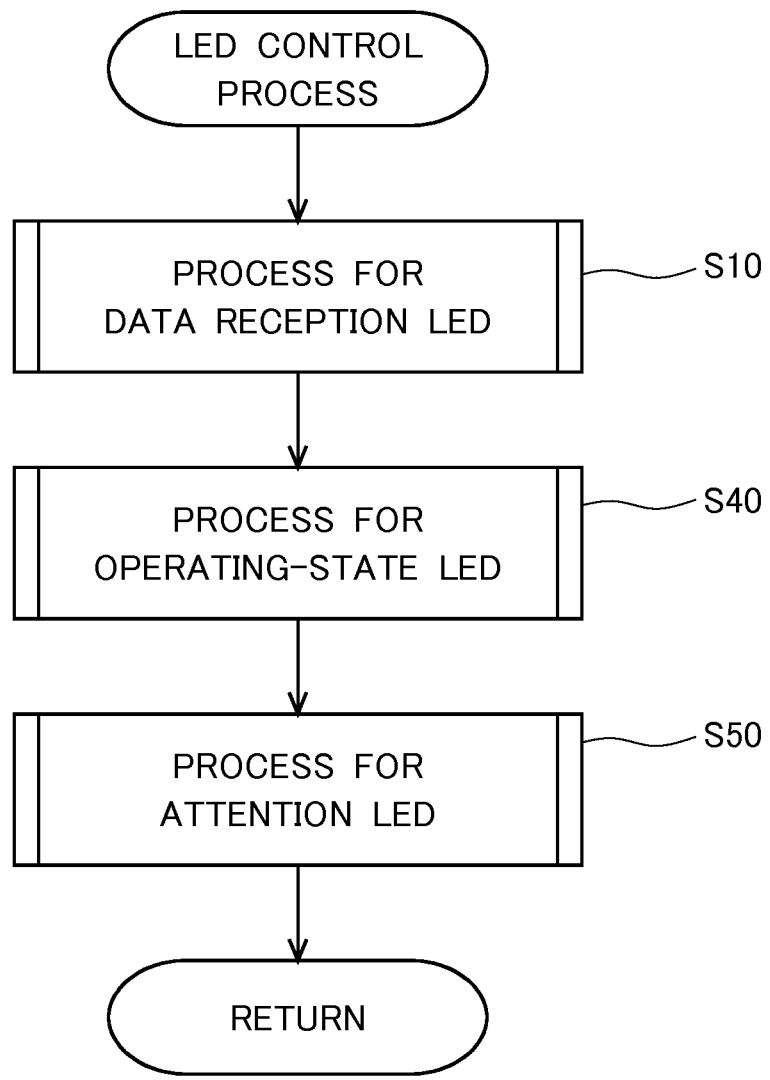
FIG. 5 is a flowchart showing an operation of the MFP for controlling a status display part.
Figure 6:
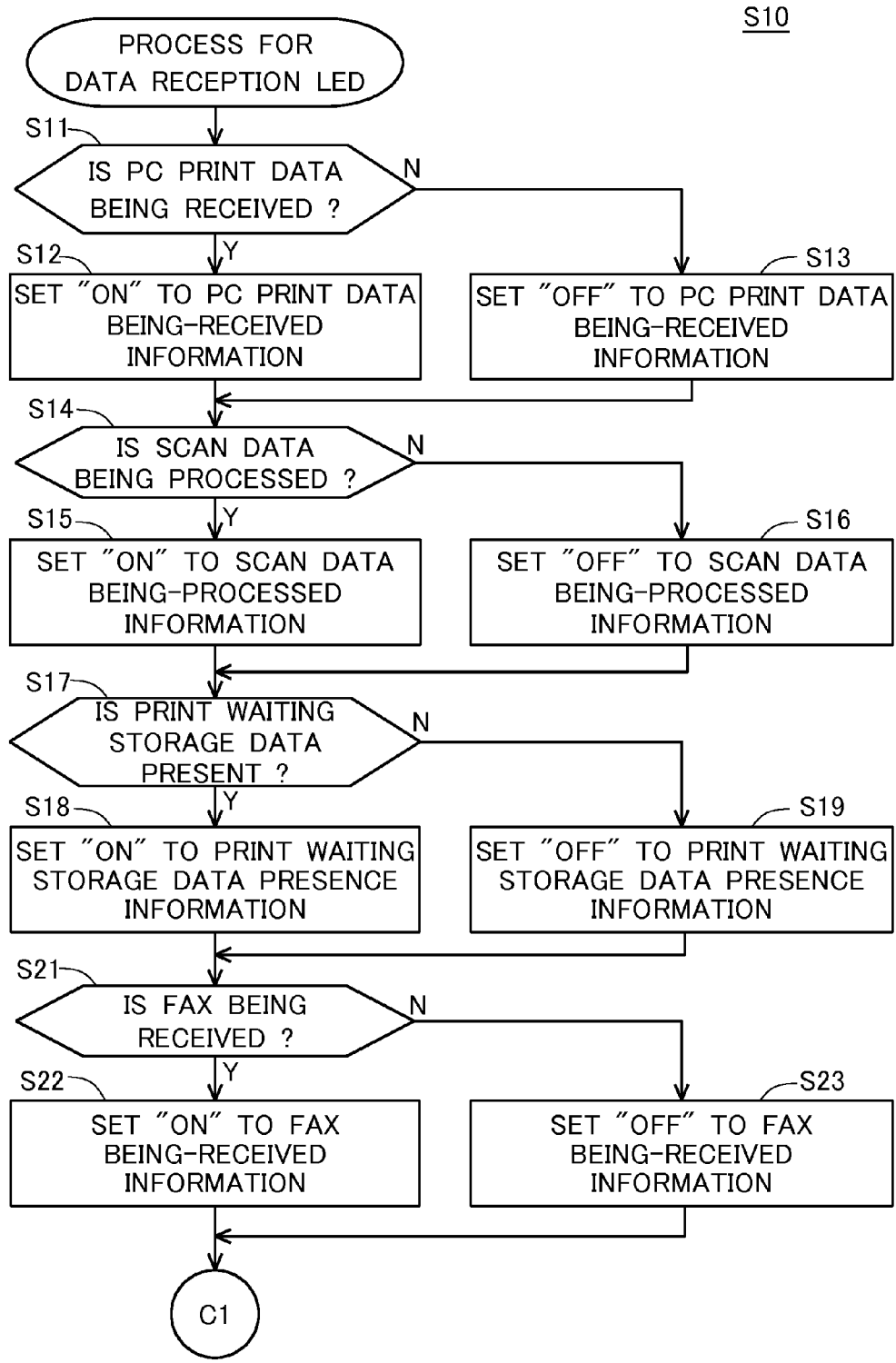
FIGS. 6 and 7 are flowcharts showing a display control operation and the like on a data reception display part.
Figure 7:
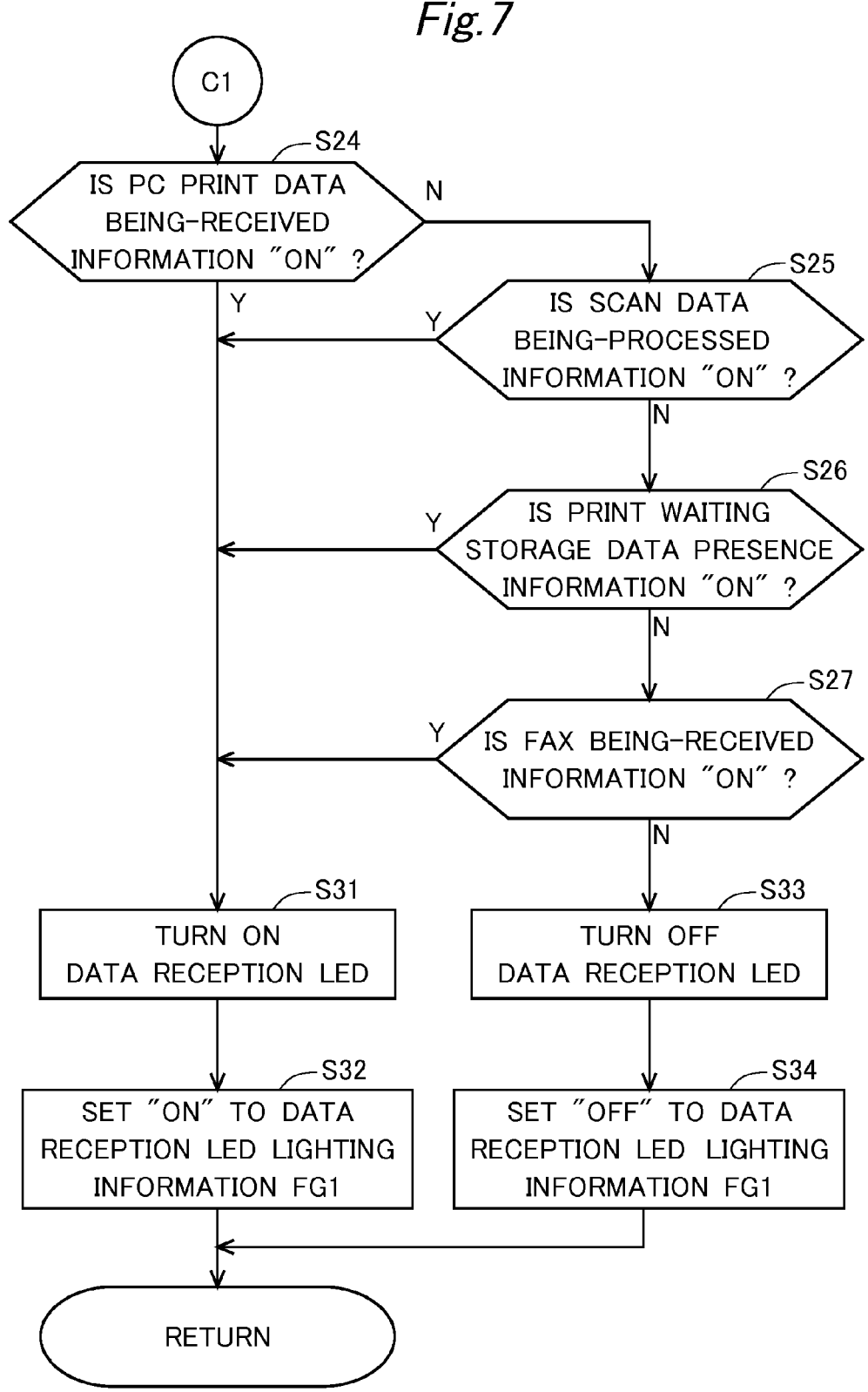
Figure 8:
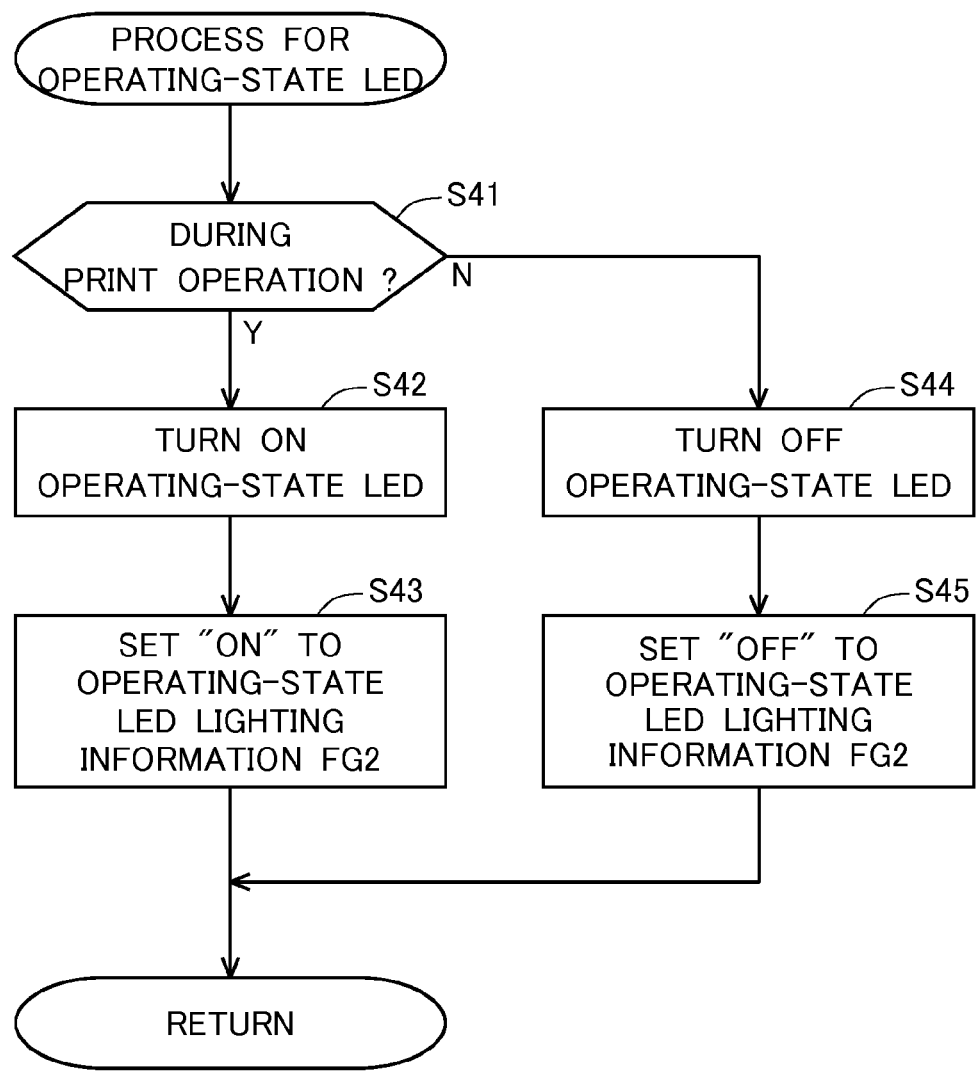
FIG. 8 is a flowchart showing a display control operation and the like on an operating-state display part.
Figure 9:
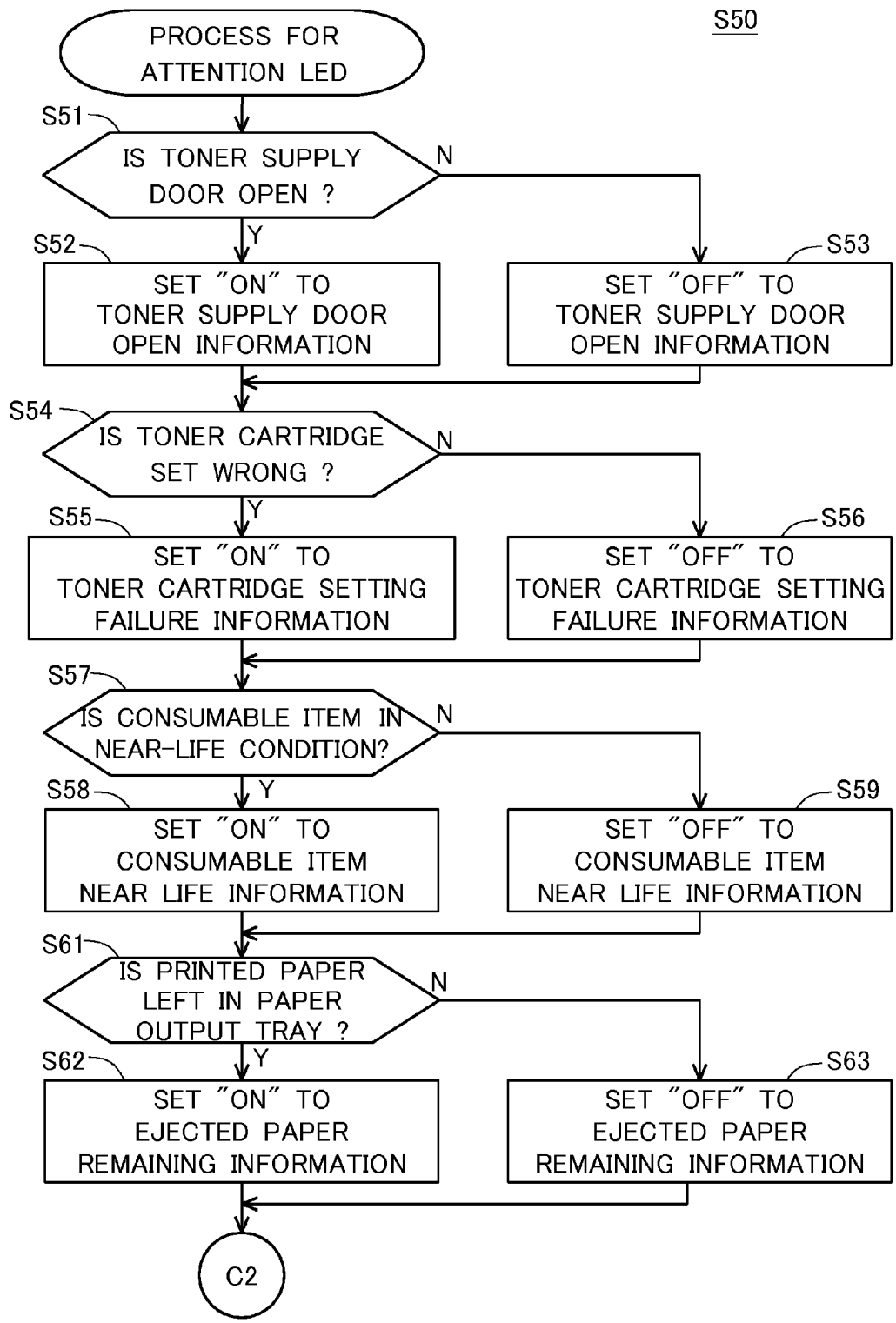
FIGS. 9 and 10 are flowcharts showing a display control operation and the like on an attention display part.
Figure 10:
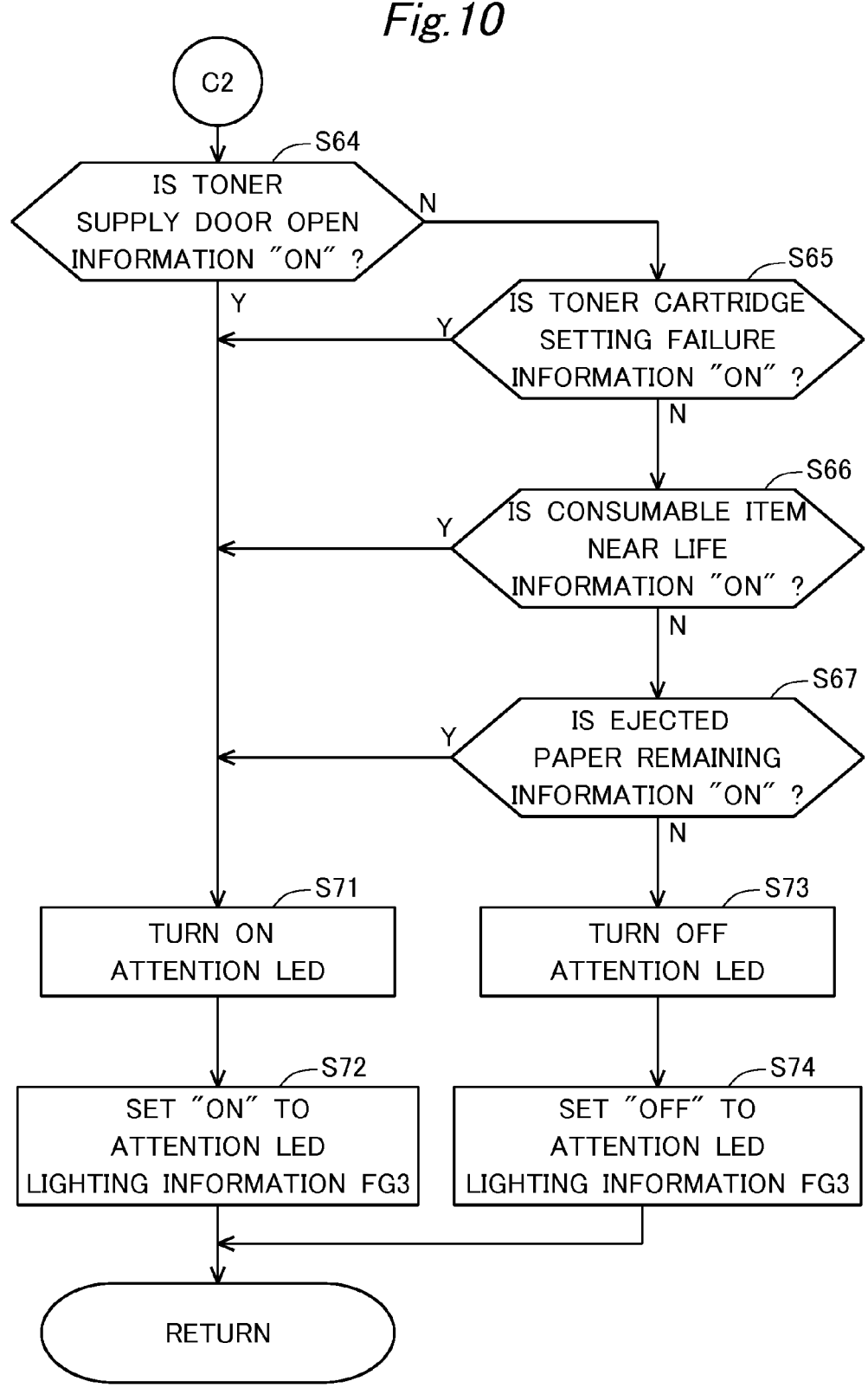

FIGS. 5 to 10 are flowcharts showing an operation of the MFP, in more detail, an operation for controlling the status display part (LED display parts 31, 32, and 33). FIG. 5 is a flowchart showing the overall flow of processes. FIGS. 6 and 7 are flowcharts showing a display control operation and the like on the data reception display part 31, FIG. 8 is a flowchart showing a display control operation and the like on the operating-state display part 32, and FIGS. 9 and 10 are flowcharts showing a display control operation and the like on the attention display part 33.

With reference to these figures, discussion will be made first on the display control operation and the like on each of the LED display parts 31, 32, and 33.

As shown in FIG. 5, in the control operation for the status display part, performed are a process (Step S10) for the data reception display part (data reception LED) 31, a process (Step S40) for the operating-state display part (operating-state LED) 32, and a process (Step S50) for the attention display part (attention LED) 33. The operation of FIG. 5 is performed at a predetermined time interval (e.g., at a time interval of 1 second), and the display content on the status display part in the MFP 10 is updated as needed.

<Data Reception Display>

In Step S10, an operation shown in FIGS. 6 and 7 is performed.

The status detection part 13 detects an apparatus status of the MFP 10 as needed, and a determination process on the basis of the detection result is performed in Steps S11, S14, S17, S21, and the like.

In Step S11 (FIG. 6), first, it is determined whether or not PC print data from another personal computer 90 (FIG. 1) or the like is being received by the MFP 10 (during reception of PC print data). When the PC print data is being received, "1" (ON state) is set to "PC print data being-received information (flag information)" (Step S12). On the other hand, when the PC print data is not being received, "0" (OFF state) is set to the flag information (PC print data being-received information) (Step S13).

Thus, in Steps S11, S12, and S13, it is determined whether or not PC print data is being received, and on the basis of the determination result, "1" (ON state) or "0" (OFF state) is set to the PC print data being-received information (flag information).

Similarly, in Steps S14, S15, and S16, performed is a determination process on whether or not scan data is being processed by the MFP 10 (during processing of scan data), and the like. Specifically, it is determined in Step S14 whether or not scan data is being processed, and when the scan data is being processed, "1" (ON state) is set to "scan data being-processed information (flag information)" (Step S15), and when the scan data is not being processed, "0" (OFF state) is set to the flag information (scan data being-processed information) (Step S16).

Further, similarly, in Steps S17, S18, and S19, performed is a determination process on whether or not print waiting storage data is present in the MFP 10 (presence or absence of print waiting storage data), and the like. Specifically, it is determined in Step S17 whether or not print waiting storage data is present, and when the print waiting storage data is present, "1" (ON state) is set to "print waiting storage data presence information (flag information)" (Step S18), and when the print waiting storage data is not present, "0" (OFF state) is set to the flag information (print waiting storage data presence information) (Step S19).

Still further, similarly, in Steps S21, S22, and S23, performed is a determination process on whether or not a facsimile is being received by the MFP 10 (during reception of facsimile), and the like. Specifically, it is determined in Step S21 whether or not a facsimile is being received, and when the facsimile is being received, "1" (ON state) is set to "facsimile being-received information (flag information)" (Step S22), and when the facsimile is not being received, "0" (OFF state) is set to the flag information (facsimile being-received information) (Step S23).

In next Steps S24 to 27, it is determined whether or not to light up the data reception display part 31.

Specifically, it is sequentially determined whether or not the four pieces of flag information ("PC print data being-received information", "scan data being-processed information", "print waiting storage data presence information", and "facsimile being-received information") each indicate "1" (ON state) (Steps S24, S25, S26, and S27).

When at least one of the four pieces of flag information indicates "1" (ON state), it is determined to light up the data reception display part (data reception LED) 31, and the process goes to Step S31. Then, in Step S31, the data reception display part 31 is lit up, and in next Step S32, "1" (ON state) is set to "data reception LED lighting information (flag information)" FG1.

On the other hand, when all the four pieces of flag information indicate "0" (OFF state), it is determined to turn off the data reception display part (data reception LED) 31, and the process goes to Step S33. Then, in Step S33, the data reception display part 31 is turned off, and in next Step S34, "0" (OFF state) is set to "data reception LED lighting information (flag information)" FG1.

After "1" is set to the data reception LED lighting information (flag information) FG1, by performing a process of Step S95 (especially, S113 (FIG. 14)) (discussed later), the data reception display area L1 on the touch panel 75 is also displayed in a "lighting-up state (blue display state)". Conversely, after "0" is set to the data reception LED lighting information (flag information) FG1, by performing the process of Step S95 (especially, S114 (FIG. 14)) (discussed later), the data reception display area L1 on the touch panel 75 is also displayed in an "extinction state (colorless display state)".

<Operating-State Display>

Next, with reference to FIG. 8, discussion will be made on a process for the operating-state display part 32 (Step S40).

Specifically, in Step S41 of FIG. 8, it is determined whether or not the MFP 10 is performing a print operation (in a print operation state), on the basis of the detection result of the apparatus status made by the status detection part 13, and a branch operation is performed in accordance with the determination result.

When it is determined that the MFP 10 is performing the print operation (in the print operation state), it is determined to light up the operating-state display part (operating-state LED) 32, and the process goes to Step S42. Then, in Step S42, the operating-state display part 32 is lit up, and in next Step S43, "1" (ON state) is set to "operating-state LED lighting information (flag information)" FG2.

On the other hand, when it is not determined that the MFP 10 is performing the print operation (in the print operation state), it is determined to turn off the operating-state display part 32, and the process goes to Step S44. Then, in Step S44, the operating-state display part 32 is turned off, and in next Step S45, "0" (OFF state) is set to "operating-state LED lighting information (flag information)" FG2.

After "1" is set to the operating-state LED lighting information (flag information) FG2, by performing the process of Step S95 (especially, S116 (FIG. 14)) (discussed later), the operating-state display area L2 on the touch panel 75 is also displayed in a "lighting-up state (white display state)".

<Attention Display>

Next, with reference to FIGS. 9 and 10, discussion will be made on a process for the attention display part 33 (Step S50).

The status detection part 13 detects the apparatus status of the MFP 10 as needed, and a determination process on the basis of the detection result is performed in Steps S51, S54, S57, S61, and the like of FIG. 9.

Specifically, in Step S51 (FIG. 9), it is determined whether or not a toner supply door of the MFP 10 is open (the MFP 10 is in a toner supply door open state). When the MFP 10 is in the toner supply door open state, "1" (ON state) is set to "toner supply door open information (flag information)" (Step S52). On the other hand, when the MFP 10 is not in the toner supply door open state, "0" (OFF state) is set to the flag information (toner supply door open information) (Step S53).

Thus, in Steps S51, 52, and S53, it is determined whether or not the MFP 10 is in the toner supply door open state, and on the basis of the determination result, "1" (ON state) or "0" (OFF state) is set to the toner supply door open information (flag information).

Similarly, in Steps S54, S55, and S56, performed is a determination process on whether or not a toner cartridge is set wrong (toner cartridge setting failure occurs), and the like. Specifically, it is determined in Step S54 whether or not toner cartridge setting failure occurs, and when the toner cartridge setting failure occurs, "1" (ON state) is set to "toner cartridge setting failure information (flag information)" (Step S55), and when the toner cartridge setting failure does not occur, "0" (OFF state) is set to the flag information (toner cartridge setting failure information) (Step S56).

Further, similarly, in Steps S57, S58, and S59, performed is a determination process on whether or not a consumable item is in a near-life condition to some degree (the MFP 10 is in a consumable item near-life state), and the like. Specifically, it is determined in Step S57 whether or not the MFP 10 is in the consumable item near-life state, and when the MFP 10 is in the consumable item near-life state, "1" (ON state) is set to "consumable item near life information (flag information)" (Step S58), and when the MFP 10 is not in the consumable item near-life state, "0" (OFF state) is set to the flag information (consumable item near life information) (Step S59).

Still further, similarly, in Steps S61, S62, and S63, performed is a determination process on whether or not printed and ejected paper is left in a paper output tray (the MFP 10 is in an ejected paper remaining state), and the like. Specifically, it is determined in Step S61 whether or not the MFP 10 is in the ejected paper remaining state, and when the MFP 10 is in the ejected paper remaining state, "1" (ON state) is set to "ejected paper remaining information (flag information)" (Step S62), and when the MFP 10 is not in the ejected paper remaining state, "0" (OFF state) is set to the flag information (ejected paper remaining information) (Step S63).

In next Steps S64 to 67, it is determined whether or not to light up the attention display part 33.

Specifically, it is sequentially determined whether or not the four pieces of flag information ("toner supply door open information", "toner cartridge setting failure information", "consumable item near life information", and "ejected paper remaining information") each indicate "1" (ON state) (Steps S64, S65, S66, and S67).

When at least one of the four pieces of flag information indicates "1" (ON state), it is determined to light up the attention display part 33, and the process goes to Step S71. Then, in Step S71, the attention display part 33 is lit up, and in next Step S72, "1" (ON state) is set to "attention LED lighting information (flag information)" FG3.

On the other hand, when all the four pieces of flag information indicate "0" (OFF state), it is determined to turn off the attention display part 33, and the process goes to Step S73. Then, in Step S73, the attention display part 33 is turned off, and in next Step S74, "0" (OFF state) is set to "attention LED lighting information (flag information)" FG3.

After "1" is set to the attention LED lighting information (flag information) FG3, by performing the process of Step S95 (especially, S119 (FIG. 14)) (discussed later), the attention display area L3 on the touch panel 75 is also displayed in a "lighting-up state (orange display state)".

1-5. Remote Operation by External Terminal 50

Figure 11:
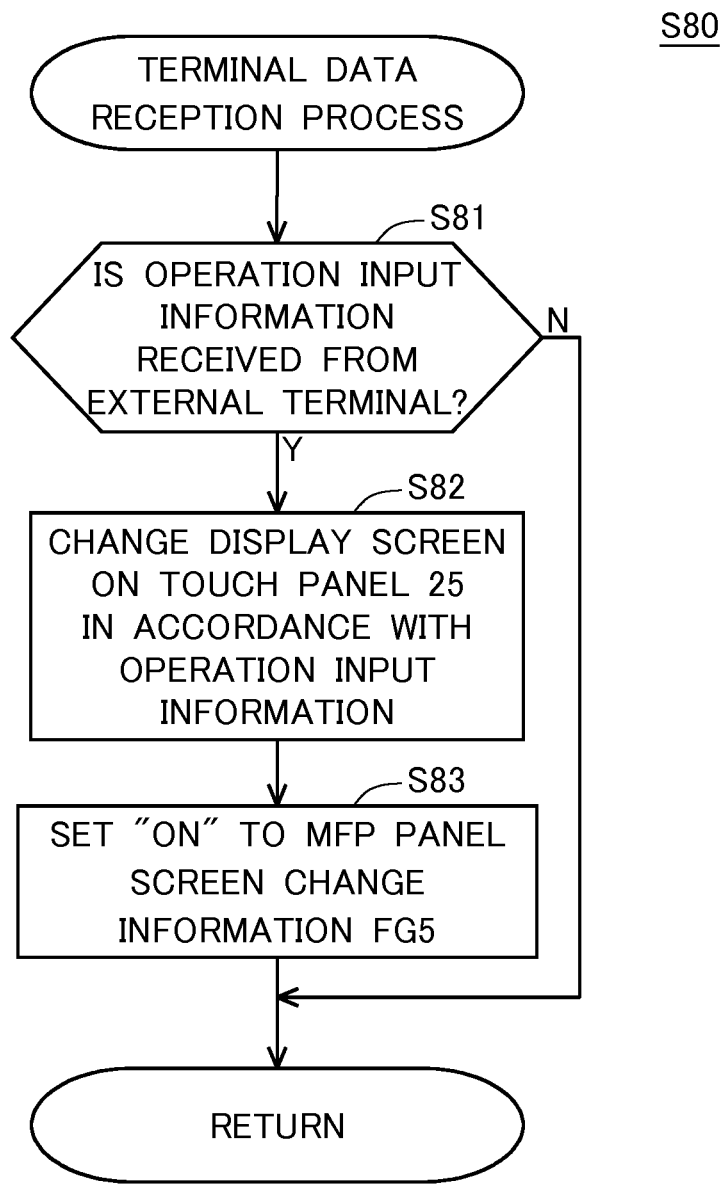
FIG. 11 is a flowchart showing an operation in accordance with whether or not there is an operation input to the remote operation screen.
Figure 12:
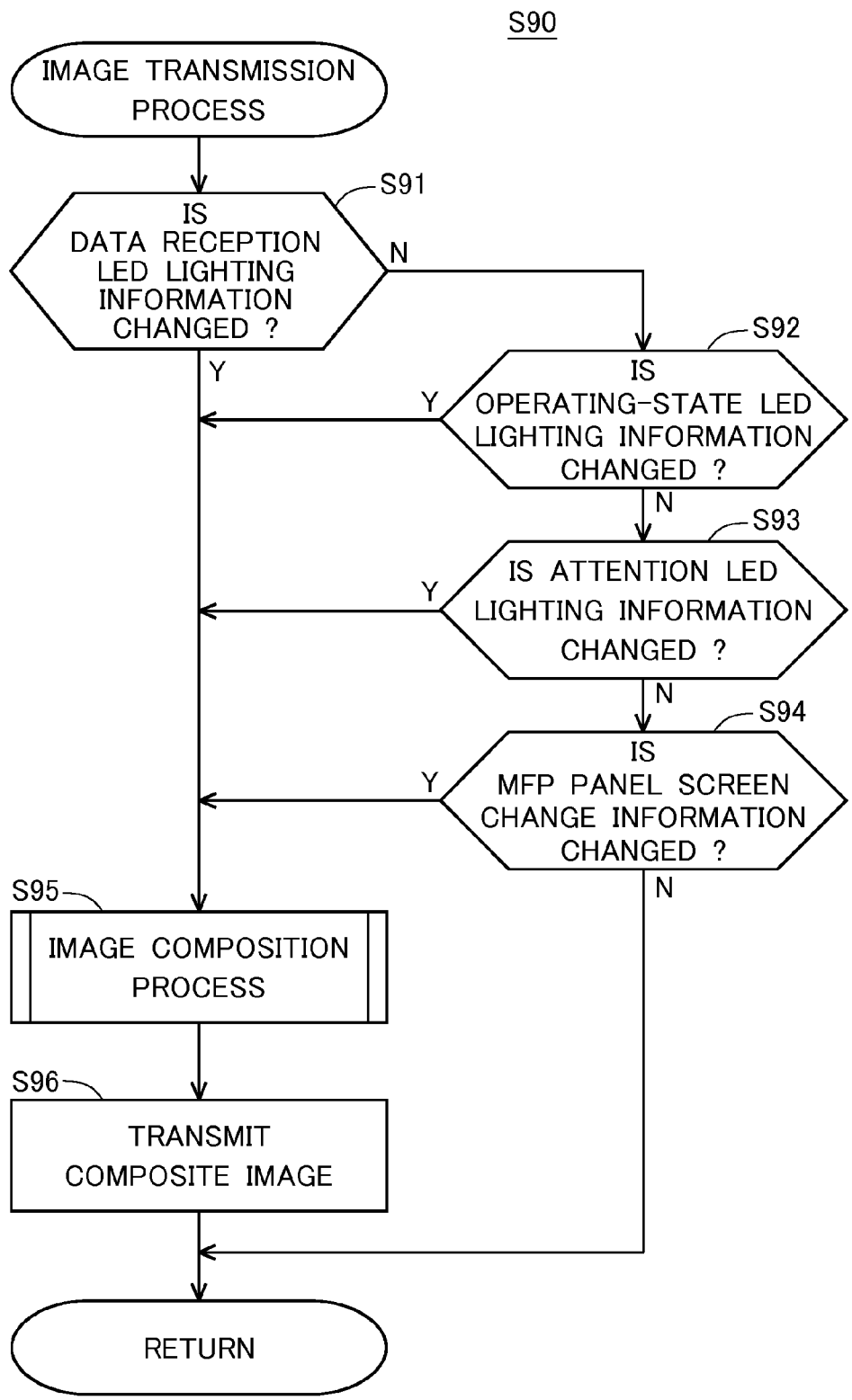
Figure 13:
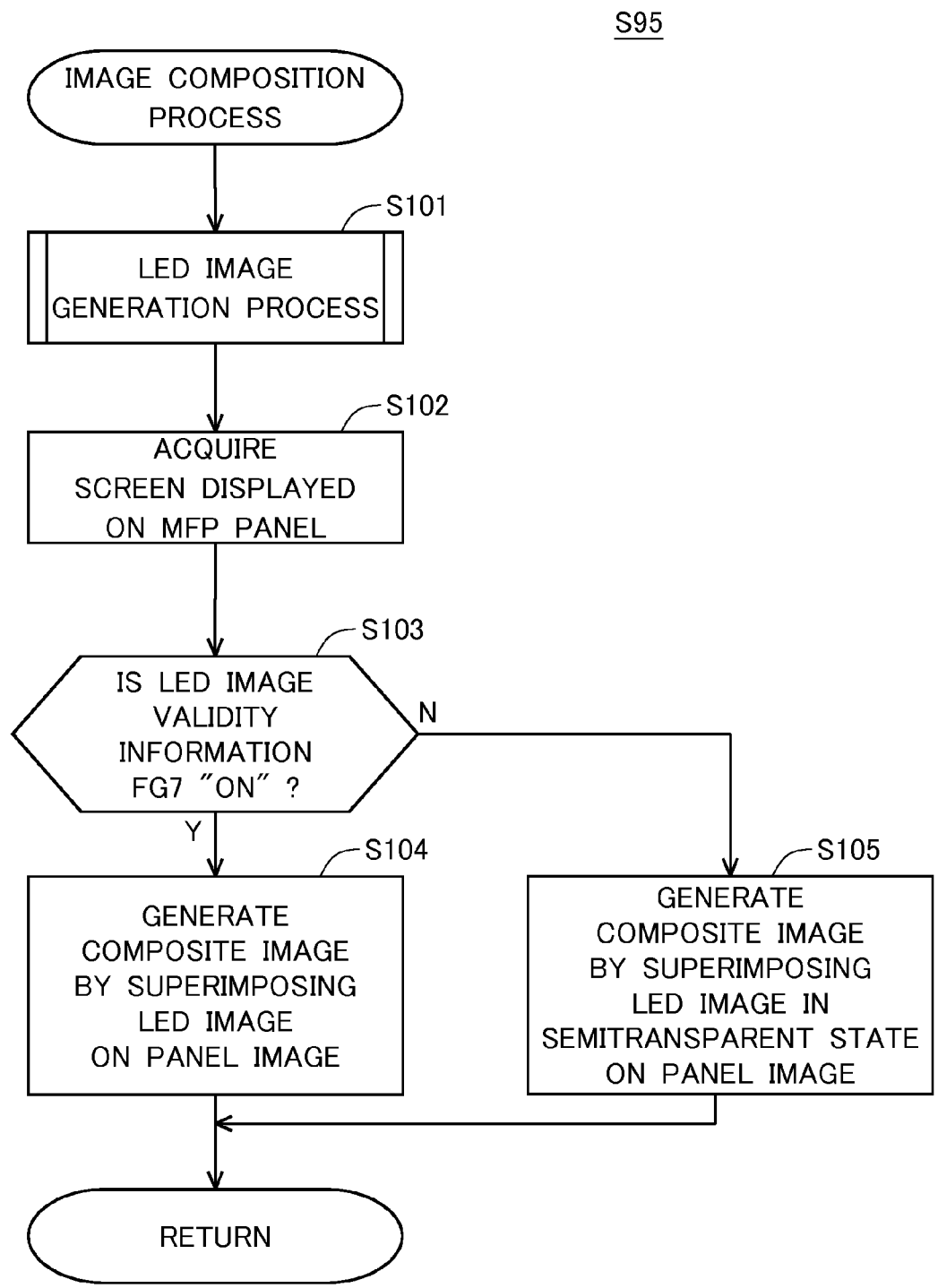
FIG. 13 is a flowchart showing an image composition operation.
Figure 14:
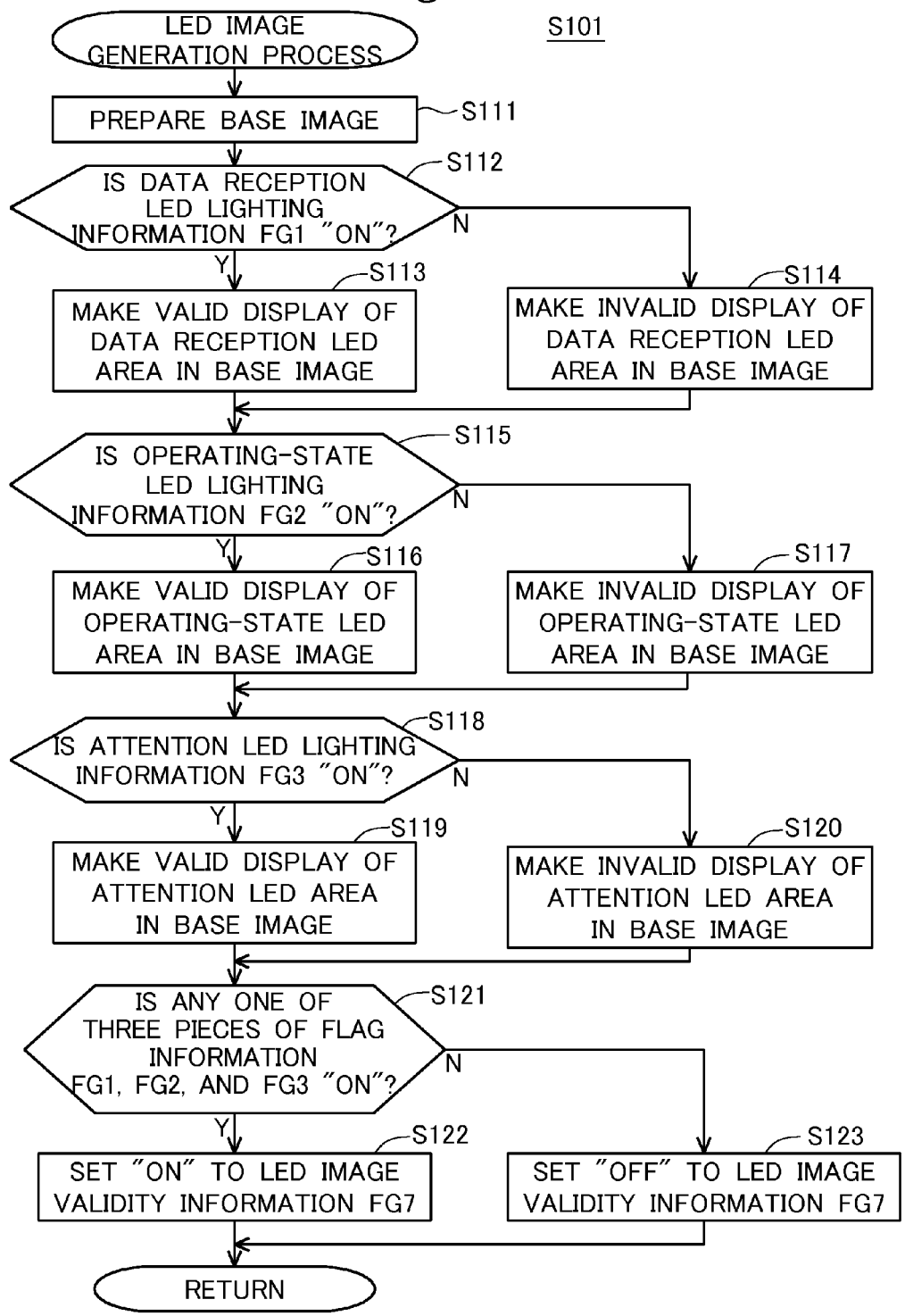
FIG. 14 is a flowchart showing an operation for generating an LED image.

Next, referring to FIGS. 11 to 15, discussion will be made on an operation of the MFP 10 in the remote operation performed by using the external terminal 50. FIG. 11 is a flowchart showing an operation regarding various processes (screen transition process and the like) in accordance with whether or not there is an operation input to the remote operation screen 222. FIGS. 12 to 14 are flowcharts showing an operation for transmitting the remote operation screen 222 to the external terminal 50 (including an operation for transmitting the updated remote operation screen 222), and the like. Particularly, FIG. 13 is a flowchart showing an image composition operation, and FIG. 14 is a flowchart showing an operation for generating the LED image 202.

In the MFP 10, besides the above-discussed operation of FIG. 5 (Steps S10, S40, and S50), the operations of Steps S80 and S90 are performed at a predetermined time interval (e.g., at a time interval of 1 second). By performing these processes, the operation screen (on the touch panel 25) in the MFP 10 and the remote operation screen 222 (on the touch panel 75) in the external terminal 50 are updated in accordance with the operation input given to the remote operation screen 222 displayed on the external terminal 50, and/or the remote operation screen 222 (display screen (on the touch panel 75) in the external terminal 50) is updated in accordance with the state change of the MFP 10 (the change of the display content on the status display part) (see FIG. 15).

First, discussion will be made on a process of Step S80 (FIG. 11).

In Step S81, it is determined whether or not operation input information (also referred to as screen operation information) from the external terminal 50 is received.

When it is not determined that the operation input information from the external terminal 50 is received, the process of Step S80 is ended.

On the other hand, when it is determined that the operation input information from the external terminal 50 is received, the process goes to Step S82. In Step S82, an operation input content is determined on the basis of the operation input information, and the content of the operation screen on the touch panel 25 is updated in accordance with the operation input content. When the button 232 (FIG. 4) for setting "color" is pressed, for example, a setting menu screen regarding the "color" is displayed on the touch panel 25 as a new operation screen (updated operation screen). Further, in next Step S83, "1" (ON state) is set to "MFP panel screen change information (flag information)" FG5. The "MFP panel screen change information (flag information)" is flag information indicating whether or not the screen on the touch panel 25 of the MFP 10 is changed, and used in next Step S90 (in more detail, Step S94).

Next, discussion will be made on a process of Step S90 (FIG. 12).

In Steps S91 to S94, it is determined whether or not to perform a composite image generation process (Step S95) and a composite image transmission process (Step S96).

Specifically, in Steps S91, S92, and S93, first, it is determined whether or not the flag information FG1, FG2, and FG3 have been changed, respectively. Further, in Step S94, it is determined whether or not the MFP panel screen change information (flag information) FG5 has been changed.

When it is determined that none of the four pieces of flag information FG1 to FG3 and FG5 have been changed, it is determined that execution of the composite image generation process and the like (Steps S95 and S96) is not needed, and the process of Step S90 is ended.

On the other hand, when it is determined that at least one of the four pieces of flag information FG1 to FG3 and FG5 has been changed, it is determined that the composite image generation process (Step S95) and the composite image transmission process (Step S96) should be performed, and the process goes to Step S95. Then, the composite image generation process (Step S95) and the composite image transmission process (Step S96) are performed. Further, in Step S96, "0" (OFF state) is set to the MFP panel screen change information (flag information) FG5 (the MFP panel screen change information FG5 is reset).

Next, with reference to FIG. 13 (and FIG. 14), discussion will be made on a detailed operation of Step S95.

In Step S101, a process for generating the LED image 202 (see FIG. 14) is performed.

Specifically, in Step S111, first, a base image 223 (see FIG. 4) of the LED image 202 is prepared. The base image 223 is provided, for example, as a black rectangular area having the same size as that of the LED image 202.

In Step S112, it is determined whether or not the data reception LED lighting information (flag information) FG1 indicates "1" (ON state). When the flag information FG1 indicates "1" (ON state), the display state of the data reception display area L1 becomes valid (Step S113). Specifically, in order to indicate the lighting-up state of the data reception display part 31, the data reception display area L1 in the base image 223 is displayed in blue (which is the same color as that of light of the data reception display part 31). On the other hand, when the flag information FG1 indicates "0" (OFF state), the display state of the data reception display area L1 becomes invalid (Step S114). Specifically, in order to indicate the extinction state of the data reception display part 31, the data reception display area L1 is displayed in clear and colorless (or with a background color of black or the like).

Further, in Step S115, it is determined whether or not the operating-state LED lighting information (flag information) FG2 indicates "1" (ON state). When the flag information FG2 indicates "1" (ON state), the display state of the operating-state display area L2 becomes valid (Step S116). Specifically, in order to indicate the lighting-up state of the operating-state display part 32, the operating-state display area L2 in the base image 223 is displayed in white (which is the same color as that of light of the operating-state display part 32). On the other hand, when the flag information FG2 indicates "0" (OFF state), the display state of the operating-state display area L2 becomes invalid (Step S117). Specifically, in order to indicate the extinction state of the operating-state display part 32, the operating-state display area L2 is displayed in clear and colorless (or with a background color of black or the like).

Still further, in Step S118, it is determined whether or not the attention LED lighting information (flag information) FG3 indicates "1" (ON state). When the flag information FG3 indicates "1" (ON state), the display state of the attention display area L3 becomes valid (Step S119). Specifically, in order to indicate the lighting-up state of the attention display part 33, the attention display area L3 in the base image 223 is displayed in orange (which is the same color as that of light of the attention display part 33). On the other hand, when the flag information FG3 indicates "0" (OFF state), the display state of the attention display area L3 becomes invalid (Step S120). Specifically, in order to indicate the extinction state of the attention display part 33, the attention display area L3 is displayed in clear and colorless (or with a background color of black or the like).

In next Step S121, a branch operation is performed on the basis of the above-discussed flag information FG1, FG2, and FG3. Specifically, when at least one of the three pieces of flag information FG1, FG2, and FG3 indicates "1" (ON state), the process goes to Step S122, and "1" (ON state) is set to "LED image validity information (flag information)" FG7. On the other hand, all the three pieces of flag information FG1, FG2, and FG3 indicate "0" (OFF state), the process goes to Step S123, and "0" (OFF state) is set to "LED image validity information (flag information)" FG7. This LED image validity information (flag information) FG7 is flag information designating the display state of the LED image 202 in the remote operation screen 222, and used in Steps S103 to S105 discussed later.

When the above-discussed process of Step S101 is ended, the process goes to next Step S102 (FIG. 13).

In Step S102, the image (panel image) 201 being displayed on the touch panel 25 is acquired. When the screen content is updated in Step S82 (FIG. 11), the panel image 201 representing the updated operation screen (the updated display content on the touch panel 25) is acquired in Step S102.

In Step S103, a branch operation is performed on the basis of the LED image validity information (flag information) FG7 whose value is set in above-discussed Steps S122 and S123.

Specifically, when the LED image validity information (flag information) FG7 indicates "1" (ON state), the process goes to Step S104. In Step S104, the composite image 210 (remote operation screen 222) is generated by combining the panel image 201 acquired in Step S102 and the LED image 202 generated in Step S101. In more detail, the composite image 210 (also referred to as 211) is generated by overwriting the LED image 202 to be superimposed on the lower area in the panel image 201.

On the other hand, when the LED image validity information (flag information) FG7 indicates "0" (OFF state), the process goes to Step S105. In Step S105, the composite image 210 (remote operation screen 222) is generated by combining the panel image 201 acquired in Step S102 and the LED image 202 generated in Step S101. In more detail, the MFP 10 performs transparent processing (e.g., transparent processing by 30% (also referred to as semitransparent processing)) on the LED image 202 generated in Step S101 and superimposes the LED image 202 after being subjected to the transparent processing on the lower area in the panel image 201, to thereby generate the composite image 210 (also referred to as 212).

Figure 15:
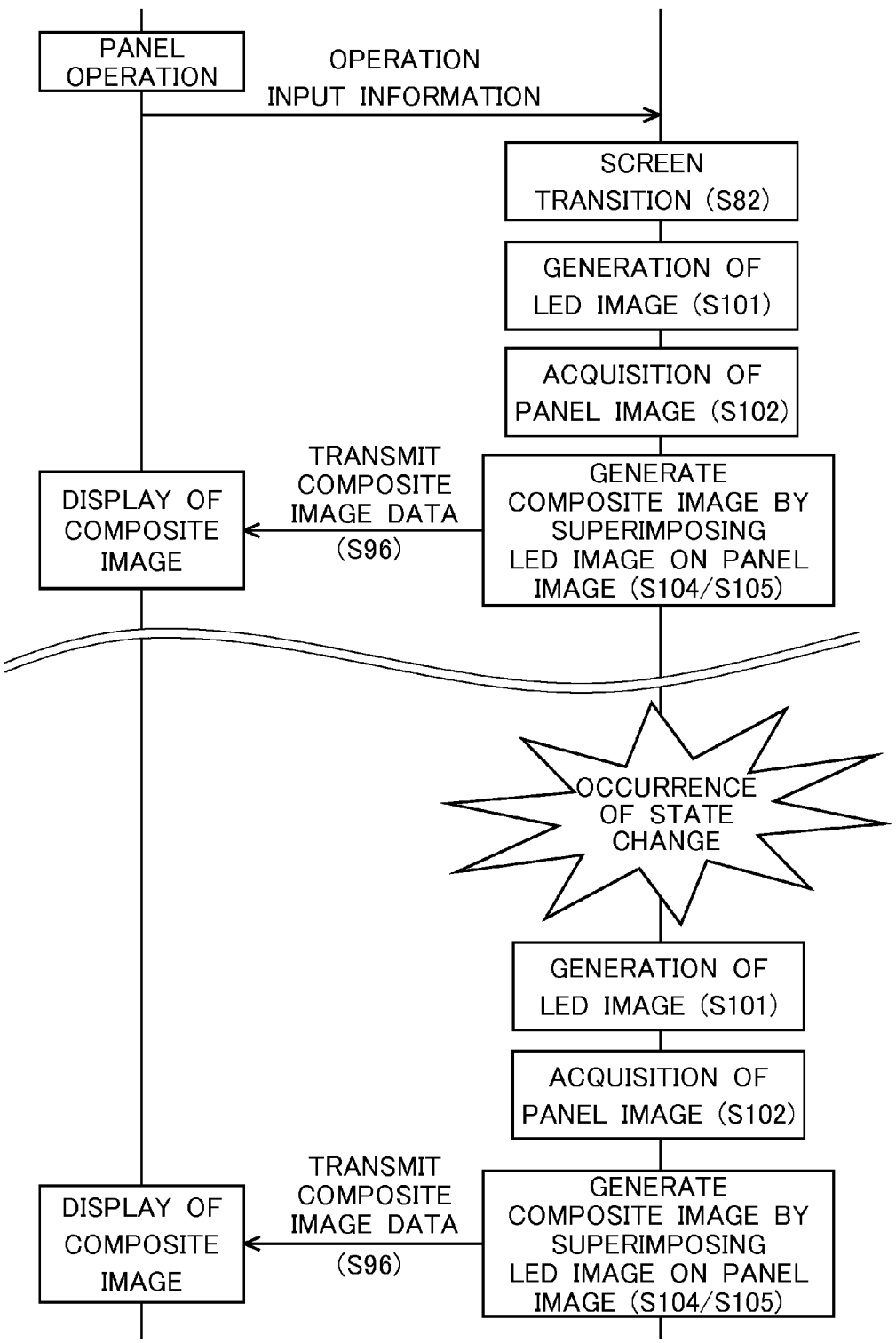
FIG. 15 is a sequence diagram showing an exemplary operation.

FIG. 15 is a sequence diagram showing the above exemplary operation.

As shown in the upper stage of FIG. 15, when an operation user gives an operation input to the operation screen displayed on the external terminal 50, information on the operation input (operation input information) is received by the MFP 10 (in more detail, the receiving part 4b (FIG. 2)) from the external terminal 50. Then, the MFP 10 performs an update process (generation process) of the panel image 201, causing a screen transition (Step S82). The MFP 10 generates the LED image 202 at that point in time (Step S101) and acquires the panel image 201 after the screen transition (Step S102). Further, the MFP 10 (in more detail, the image generation part 15 (FIG. 2)) generates the image (composite image) 210 by combining the panel image 201 after the screen transition and the LED image 202 at that point in time (Step S104/S105). Then, the MFP 10 (in more detail, the transmitting part 4a (FIG. 2)) transmits image data of the composite image 210 to the external terminal 50 as display data for the remote operation screen 222 (Step S96). On the other hand, the external terminal 50 (input/output control part 65) displays the composite image (updated composite image) on the basis of the received image data on the touch panel 75 thereof. After that, the operation user can give a new operation input to the updated composite image 210 (updated remote operation screen 222) displayed on the touch panel 75.

Further, as shown in the lower stage of FIG. 15, when a state change of the MFP 10 occurs, the MFP 10 generates the LED image 202 at that point in time (Step S101) and acquires the panel image 201 at that point in time (Step S102). Then, the image generation part 15 of the MFP 10 generates the composite image 210 by combining the panel image 201 and the LED image 202 (Step S104/S105), and the transmitting part 4a of the MFP 10 transmits the data of the composite image 210 to the external terminal 50 as the display data for the remote operation screen 222 (Step S96). On the other hand, the external terminal 50 displays the composite image (updated composite image) 210 on the basis of the received data, on the touch panel 75 thereof. This makes it possible to display the composite image including LED image 202 reflecting the state of the MFP 10 after the state change, on the touch panel 75. Therefore, the operation user can know the state of the MFP 10 at this point in time through the LED image 202 on the touch panel 75. Further, after that, the operation user can give a new operation input to the updated composite image displayed on the touch panel 75.

Thus, in the above-discussed preferred embodiment, the data regarding both the panel image 201 and the LED image 202 regarding the status display part is transmitted from the MFP 10 to the external terminal 50 as the display data for the external terminal 50. In more detail, the composite image of the panel image 201 and the LED image 202 is generated by the MFP 10 (image generation part 15), and the image data of the composite image is transmitted from the MFP 10 to the external terminal 50. Then, the composite image of these images is displayed on the external terminal 50 as the operation input screen.

Therefore, when the user remotely operates the MFP 10 by using the external terminal 50, the user can easily know the apparatus status of the MFP 10.

For example, when a user (operation user) visually recognizes that the data reception display area L1 in the LED image 202 on the touch panel 75 of the external terminal 50 is displayed in blue, the user can know that the data reception display part 31 in the MFP 10 is lit up and recognize that there is good possibility that a print output by another user will be performed in the MFP 10 in accordance with the data reception. Therefore, considering that there is a good possibility that the start and end of his own copy job will be delayed due to the antecedent print output by another user, the operation user can perform his copy job by using another MFP 10 (not shown). Thus, the user who knows the lighting of the data reception display part 31 can take some measures as circumstances demand.

Similarly, when a user (operation user) visually recognizes that the operating-state display area L2 in the LED image 202 on the touch panel 75 of the external terminal 50 is displayed in white, the user can know that the operating-state display part 32 in the MFP 10 is lit up and recognize that a print output (print operation) by another user is being performed in the MFP 10. Particularly, even when the operation user is present at a place remote from the MFP 10, the operation user can recognize that the MFP 10 is performing the print operation. Therefore, considering that there is a good possibility that his own copy job will be delayed due to the antecedent print output by another user, the operation user can perform his copy job by using another MFP 10 (not shown). Thus, the user who knows the lighting of the operating-state display part 32 can take some measures as circumstances demand.

Still similarly, when a user (operation user) visually recognizes that the attention display area L3 in the LED image 202 on the touch panel 75 of the external terminal 50 is displayed in orange, the user can know that the attention display part 33 in the MFP 10 is lit up. Therefore, considering that the MFP 10 is in the attention state, the operation user can perform his copy job by using another MFP 10 (not shown) or can take appropriate response to solve the attention state of the MFP 10. Thus, the user who knows the lighting of the attention display part 33 can take some measures as circumstances demand.

Further, in the above-discussed operation, when the MFP 10 is brought into at least one of the three states, i.e., the "data reception state", the "print operation state", and the "attention state (cautionary state)", the composite image 210 (211) is generated by superimposing the LED image 202 in a "non-transparent state" on the panel image 201 (Step S104). Then, the image data of the composite image 211 is transmitted to the external terminal 50 (Step S96). Further, the composite image 211 is displayed on the touch panel 75 of the external terminal 50. With this operation, it is possible to reliably notify the operation user, by using the LED image 202, that the MFP 10 is brought into at least one of the above three states.

Conversely, when the MFP 10 is not brought into any one of the three states, i.e., the "data reception state", the "print operation state", and the "attention state", the composite image 210 (212) is generated by superimposing the LED image 202 in a "semitransparent state" on the panel image 201. Then, the image data of the composite image 212 (Step S105) is transmitted to the external terminal 50 (Step S96). Further, the composite image 212 is displayed on the touch panel 75 of the external terminal 50. With this operation, since the LED image 202 is displayed, being inconspicuous, in the "semitransparent state" when the MFP 10 is not brought into any one of the above three states, it is possible to suppress deterioration in operability.

2. The Second Preferred Embodiment

The second preferred embodiment is a variation of the first preferred embodiment. Discussion will be made below, centering on the difference between the first and second preferred embodiments.

In the above-discussed first preferred embodiment, the case has been discussed where the MFP 10 generates the composite image of the panel image 201 and the LED image 202 and transmits the image data of the composite image to the external terminal 50.

In the second preferred embodiment, the MFP 10 does not combine the panel image 201 and the LED image 202 and separately transmits image data of the panel image 201 and image data of the LED image 202 to the external terminal 50. Then, the external terminal 50 generates a composite image by combining the two images 201 and 202, on the basis of the respective received image data, and displays the composite image on the touch panel 75. Thus, in the second preferred embodiment, the generation process of the composite image (image composition process) is performed on the side of the external terminal 50.

As shown in FIG. 18, a controller 59 of an external terminal 50 in accordance with the second preferred embodiment further has an image composition part 63. The image composition part 63 generates a composite image by combining the panel image 201 and the LED image 202 on the basis of the respective image data of the images 201 and 202 received from the MFP 10. Then, the input/output control part 65 of the controller 59 displays the composite image generated by the image composition part 63 on the touch panel 75 as the remote operation screen 222.

In the second preferred embodiment, instead of the process of Step S90 (FIG. 12), a process of Step S140 (FIG. 16) is performed.

Figure 16:
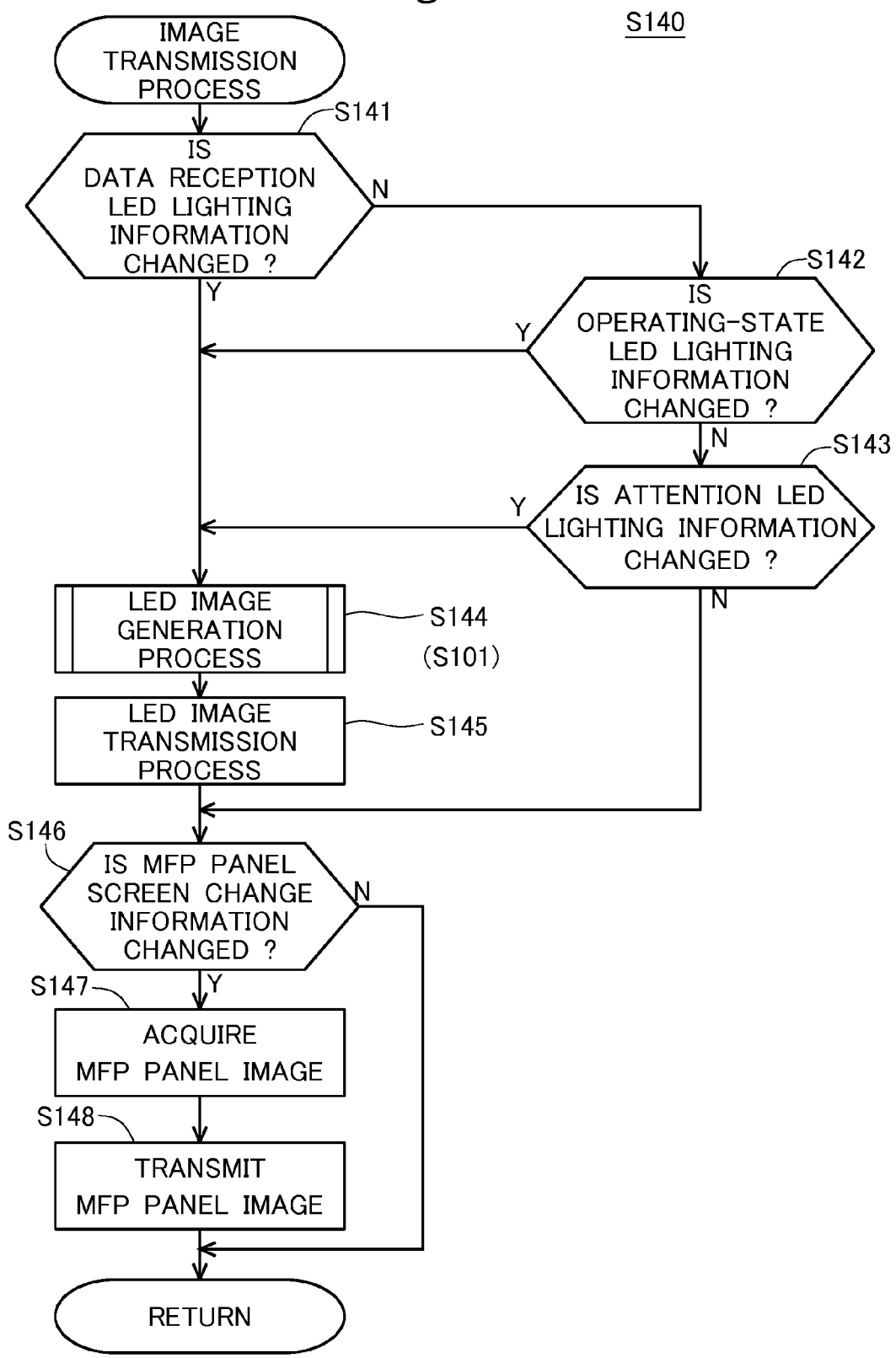
FIG. 16 is a flowchart showing an operation of the MFP in accordance with a second preferred embodiment of the present invention.

FIG. 16 is a flowchart showing an operation of the MFP 10 (also referred to as 10B) in accordance with the second preferred embodiment, in more detail, a transmission operation regarding the remote operation screen 222 and the like.

In Steps S141 to S143, it is determined whether or not to perform the generation process of the LED image 202 (Step S144) and the transmission process of the LED image 202 (Step S145).

Specifically, in Steps S141, S142, and S143, first, it is determined whether or not the flag information FG1, FG2, and FG3 have been changed, respectively.

When it is determined that none of the three pieces of flag information FG1, FG2, and FG3 have been changed, it is determined that execution of the generation process of the LED image 202, and the like (Steps S144 and S145) is not needed, and the process goes to next Step S146.

On the other hand, when it is determined that at least one of the three pieces of flag information FG1 to FG3 has been changed, it is determined that the generation process of the LED image 202 (Step S144) and the transmission process of the LED image 202 (Step S145) should be performed. Then, the generation process of the LED image 202 (Step S144) and the transmission process of the LED image 202 (Step S145) are performed. Further, the process of Step S144 is the same process as that of Step S101 (FIG. 14). In Step S145, only the LED image 202 out of the panel image 201 and the LED image 202 is transmitted to the external terminal 50.

Further, in Step S146, it is determined whether or not the MFP panel screen change information (flag information) FG5 has been changed.

When it is determined that the flag information FG5 has not been changed, it is determined that execution of a transmission process of the panel image 201, and the like (Steps S147 and S148) is not needed, and the process of Step S140 is ended.

On the other hand, when it is determined that the flag information FG5 has been changed, it is determined that the transmission process of the panel image 201 should be performed, and an acquisition process of the panel image 201 (Step S147) and a transmission process of the panel image 201 (Step S148) are performed.

Figure 17:
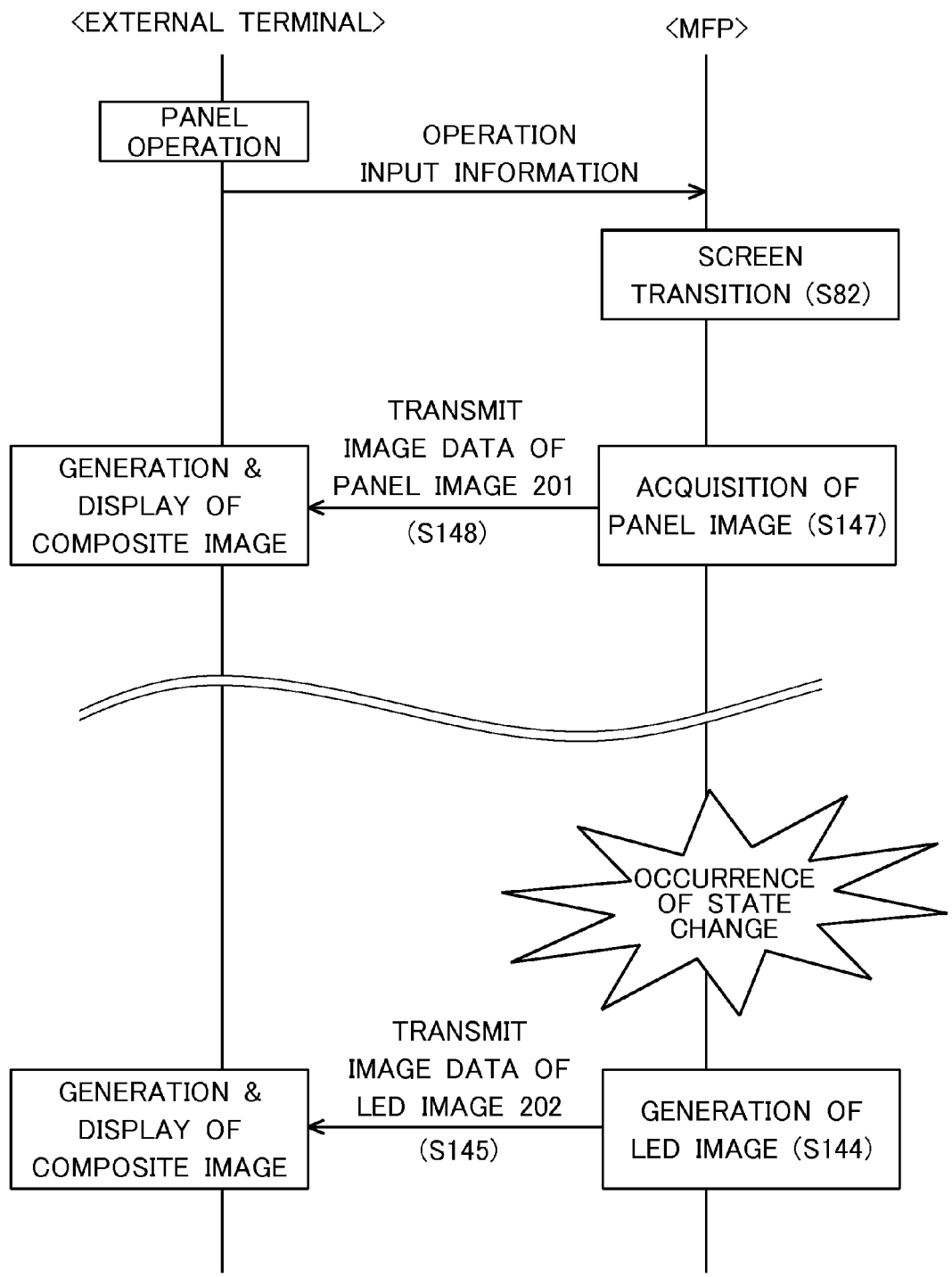
FIG. 17 is a sequence diagram showing an exemplary operation in accordance with the second preferred embodiment.

FIG. 17 is a sequence diagram showing the above exemplary operation.

As shown in the upper stage of FIG. 17, when an operation user gives an operation input to the remote operation screen 222 displayed on the touch panel 75 of the external terminal 50, information on the operation input (operation input information) is received by the MFP 10 from the external terminal 50. Then, the MFP 10 performs the update process (generation process) of the panel image 201, causing a screen transition. Further, the MFP 10 acquires the image data of the panel image 201 after the screen transition and transmits the image data to the external terminal 50 (Steps S147 and S148).

When the button 232 for setting "color" is pressed in the remote operation screen 222 of FIG. 4, for example, the operation input information including the information on the pressing of the button 232 is transmitted from the external terminal 50 to the MFP 10. Then, the MFP 10 displays the setting menu screen regarding the "color" is displayed on the touch panel 25 as a new operation screen (updated operation screen), and generates the panel image 201 regarding the updated operation screen (updated panel image 201) and transmits image data of the updated panel image 201 to the external terminal 50 (Step S148). Thus, when the operation screen is updated in accordance with the operation input from the external terminal 50, the MFP 10 transmits only the image data of the panel image 201, out of the image data of the panel image 201 and the image data of the LED image 202, to the external terminal 50 in response to the reception of the operation input information from the external terminal 50.

On the other hand, the external terminal 50 generates the composite image (updated composite image) on the basis of respective image data regarding a newly-received updated panel image 201 and the unchanged LED image 202 (immediately preceding LED image 202, which is temporarily stored in the external terminal 50), and displays the composite image on the touch panel 75. After that, the operation user can give a new operation input to the updated composite image displayed on the touch panel 75.

Further, as shown in the lower stage of FIG. 17, when a state change of the MFP 10 occurs, the MFP 10 generates the LED image 202 at that point in time (Step S144) and transmits image data of the LED image 202 to the external terminal 50 (Step S145).

In more detail, in response to detection of the transition of the MFP 10 to the specific state (in more detail, a state which corresponds to at least one of three states, i.e., the data reception state, the print operation state, and the attention state), which is made by the status detection part 13, the MFP 10 transmits only the image data of the LED image 202 out of the image data of the panel image 201 and the image data of the LED image 202, to the external terminal 50. This LED image 202 includes an image regarding a notification part indicating the transition to the specific state (for example, the data reception display area L1 in blue indicating the blue lighting state of the data reception display part 31).

On the other hand, the external terminal 50 generates the composite image (updated composite image) on the basis of respective image data regarding the received LED image 202 and the unchanged panel image 201 (immediately preceding panel image 201, which is temporarily stored in the external terminal 50), and displays the composite image on the touch panel 75. This makes it possible to display the composite image including LED image 202 reflecting the state of the MFP 10 after the state change, on the touch panel 75. Therefore, the operation user can know the state of the MFP 10 at this point in time through the LED image 202 on the touch panel 75 of the external terminal 50. Further, after that, the operation user can give a new operation input to the updated composite image displayed on the touch panel 75.

With the above-discussed operation, the respective data regarding the panel image 201 and the LED image 202 regarding the status display part are transmitted to the external terminal 50 as the display data for the external terminal 50. In more detail, the image data of the panel image 201 and the image data of the LED image 202 are separately transmitted to the external terminal 50. Then, the composite image on the basis of the respective image data is generated in the external terminal 50 and the composite image is displayed on the touch panel 75 of the external terminal 50 as the operation input screen. Therefore, when the user remotely operates the MFP 10 by using the external terminal 50, the user can easily know the apparatus status of the MFP 10.

Particularly, when the operation user gives an operation input to the remote operation screen 222 displayed on the touch panel 75 of the external terminal 50, the MFP 10 updates the content of the panel image 201 on the basis of the operation input information from the external terminal 50 and transmits only the image data of the updated panel image 201 out of the respective image data of the two kinds of images 201 and 202, to the external terminal 50. Then, the external terminal 50 generates the composite image 210 on the basis of the image data of the newly-received panel image 201 and the image data of the already-existing LED image 202, and displays the composite image 210 on the touch panel 75 as the remote operation screen 222. With this operation, it is possible to suppress the communication traffic in the transmission and reception of the image data.

Further, the status display part has three notification parts (in more detail, the data reception display area L1, the operating-state display area L2, and the attention display area L3) for notifying that the MFP 10 is brought into any one of the three states, i.e., the "data reception state", the "print operation state", and the "attention state", respectively. Then, when the status detection part 13 detects that the MFP 10 is brought into at least one of the three states, only the image data of the LED image 202 (including an image regarding the areas L1, L2, and L3 indicating the transition and the like to the respective states), out of the image data of the image 201 and the image data of the image 202, is transmitted to the external terminal 50. Therefore, since the transmission of the data regarding the panel image 201 is reduced by transmitting only the image data of the LED image 202, it is possible to suppress the communication traffic.

3. Variations

Though the preferred embodiments of the present invention have been discussed above, the present invention is not limited to the above-discussed preferred embodiments.

Though the status display part is displayed in the semitransparent state when the MFP 10 is not brought into any one of the three states, i.e., the data reception state, the print operation state, and the attention state in the above-discussed preferred embodiments, for example, this is only one exemplary case and the status display part may be always displayed in the nontransparent state regardless of the apparatus status of the MFP 10.

Further, though the case has been discussed where the status display part has the respective notification parts for notifying that the MFP 10 is brought into any one of the three states, i.e., the data reception state, the print operation state, and the attention state in the above-discussed preferred embodiments, this is only one exemplary case. For example, the status display part may have respective notification parts for notifying that the MFP 10 is brought into any one of other predetermined number of (one, two, or more than three) states. Further, the state notified by any one of the notification parts may include at least one of the above three kinds of states (the data reception state, the print operation state, and the attention state) or include other kinds of states.

While the invention has been shown and described in detail, the foregoing description is in all aspects illustrative and not restrictive. It is therefore understood that numerous modifications and variations can be devised without departing from the scope of the invention.

What is claimed is:

1. An image forming apparatus which can be remotely operated by an external terminal, comprising:
   a touch panel for displaying various information and receiving an operation input from an operator;
   a status detection part for detecting an apparatus status of said image forming apparatus;
   a status display part provided separately from said touch panel, for displaying said apparatus status detected by said status detection part;
   a generation part for generating data of a first image representing a display content on said touch panel and a second image representing a display content on said status display part; and
   a transmitting part for transmitting said data of said first and second images to said external terminal as display data for a remote operation screen on said external terminal.

2. The image forming apparatus according to claim 1, wherein
   said transmitting part separately transmits image data of said first image and image data of said second image to said external terminal as said display data for said remote operation screen.

3. The image forming apparatus according to claim 2, wherein
   said status display part has a notification part for notifying that said image forming apparatus is brought into a specific state, and
   said transmitting part transmits only said image data of said second image including an image regarding said notification part, which indicates a transition to said specific state, out of said image data of said first image and said image data of said second image, to said external terminal in response to detection of said transition of said image forming apparatus to said specific state, said detection being made by said status detection part.

4. The image forming apparatus according to claim 3, wherein
   said specific state is at least one of a data reception state, a print operation state, and an attention state.

5. The image forming apparatus according to claim 2, further comprising:
   a receiving part for receiving operation input information which is information on an operation input to said remote operation screen displayed on said external terminal, from said external terminal,
   wherein said generation part updates said first image, which updated first image represents an updated display content on said touch panel, on the basis of said operation input information, and
   said transmitting part transmits only image data of said first image after being updated, out of said image data of said first image after being updated and said image data of said second image, to said external terminal.

6. The image forming apparatus according to claim 1, wherein
   said generation part generates a composite image by combining said first image and said second image, and
   said transmitting part transmits image data of said composite image to said external terminal as said display data for said remote operation screen.

7. The image forming apparatus according to claim 6, wherein
   said status display part has a plurality of notification parts for notifying that said image forming apparatus is brought into any one of a plurality of states, respectively, including at least one of a data reception state, a print operation state, and an attention state,
   said second image has an image regarding said plurality of notification parts,
   said transmitting part transmits said image data of said composite image generated by superimposing said second image in a nontransparent state on said first image to said external terminal when said image forming apparatus is brought into at least one of said plurality of states, and
   said transmitting part transmits said image data of said composite image generated by superimposing said second image in a semitransparent state on said first image to said external terminal when said image forming apparatus is not brought into any one of said plurality of states.

8. The image forming apparatus according to claim 6, wherein
said transmitting part transmits said image data of said composite image generated by superimposing said second image in a nontransparent state on said first image to said external terminal when said image forming apparatus is brought into a specific state, and
said transmitting part transmits said image data of said composite image generated by superimposing said second image in a semitransparent state on said first image to said external terminal when said image forming apparatus is not brought into said specific state.

9. The image forming apparatus according to claim 8, wherein
said specific state is at least one of a data reception state, a print operation state, and an attention state.

10. A non-transitory computer-readable recording medium for recording therein a computer program to be executed by a computer embedded in an image forming apparatus which can be remotely operated by an external terminal, to cause said computer to perform the steps of:
a) detecting an apparatus status of said image forming apparatus;
b) displaying said apparatus status detected in said step a), on a status display part provided in said image forming apparatus separately from a touch panel; and
c) transmitting data of a first image representing a display content on said touch panel and a second image representing a display content on said status display part to said external terminal as display data for a remote operation screen on said external terminal.

11. The non-transitory computer-readable recording medium for recording therein a computer program according to claim 10, wherein
said transmitting includes separately transmitting image data of said first image and image data of said second image to said external terminal as said display data for said remote operation screen;
said displaying includes notifying that said image forming apparatus is brought into a specific state, and
said transmitting transmits only said image data of said second image including an image regarding said notification, which indicates a transition to said specific state, out of said image data of said first image and said image data of said second image, to said external terminal in response to detection of said transition of said image forming apparatus to said specific state.

12. The non-transitory computer-readable recording medium for recording therein a computer program according to claim 11, wherein said specific state is at least one of a data reception state, a print operation state, and an attention state.

13. The non-transitory computer-readable recording medium for recording therein a computer program according to claim 10, further comprising:
generating a composite image by combining said first image and said second image, and
transmitting image data of said composite image to said external terminal as said display data for said remote operation screen,
wherein:
said displaying includes notifying that said image forming apparatus is brought into any one of a plurality of states, respectively, including at least one of a data reception state, a print operation state, and an attention state,
said second image has an image regarding said plurality of states,
said transmitting transmits said image data of said composite image generated by superimposing said second image in a nontransparent state on said first image to said external terminal when said image forming apparatus is brought into at least one of said plurality of states, and
said transmitting transmits said image data of said composite image generated by superimposing said second image in a semitransparent state on said first image to said external terminal when said image forming apparatus is not brought into any one of said plurality of states.

14. The non-transitory computer-readable recording medium for recording therein a computer program according to claim 10, further comprising:
generating a composite image by combining said first image and said second image, and
transmitting image data of said composite image to said external terminal as said display data for said remote operation screen,
wherein
said transmitting transmits said image data of said composite image generated by superimposing said second image in a nontransparent state on said first image to said external terminal when said image forming apparatus is brought into a specific state, and
said transmitting transmits said image data of said composite image generated by superimposing said second image in a semitransparent state on said first image to said external terminal when said image forming apparatus is not brought into said specific state.

15. The image forming apparatus according to claim 14, wherein
said specific state is at least one of a data reception state, a print operation state, and an attention state.

16. An image forming system, comprising:
an image forming apparatus; and
an external terminal for remotely operating said image forming apparatus by using a remote operation screen,
wherein said image forming apparatus has:
a touch panel for displaying various information and receiving an operation input from an operator;
a status detection part for detecting an apparatus status of said image forming apparatus;
a status display part provided separately from said touch panel, for displaying said apparatus status detected by said status detection part; and
a transmitting part for transmitting data of a first image representing a display content on said touch panel and a second image representing a display content on said status display part to said external terminal as display data for a remote operation screen on said external terminal, and
said external terminal has:
a receiving part for receiving said data of said first and second images;
a display part for displaying said remote operation screen thereon; and
a control part for controlling said remote operation screen to be displayed on said display part on the basis of said data of said first and second images.

17. The image forming system according to claim 16, wherein
said transmitting part of said image forming apparatus separately transmits image data of said first image and image data of said second image to said external terminal, and said control part of said external terminal generates a composite image of said first image and said second image on the basis of said image data of said first image and said image data of said second image and controls said display part to display said composite image which is generated, as said remote operation screen.

18. The image forming system according to claim 16, wherein
said transmitting part separately transmits image data of said first image and image data of said second image to said external terminal as said display data for said remote operation screen; and
said status display part has a notification part for notifying that said image forming apparatus is brought into a specific state, and
said transmitting part transmits only said image data of said second image including an image regarding said notification part, which indicates a transition to said specific state, out of said image data of said first image and said image data of said second image, to said external terminal in response to detection of said transition of said image forming apparatus to said specific state, said detection being made by said status detection part.

19. The image forming system according to claim 18, wherein said specific state is at least one of a data reception state, a print operation state, and an attention state.

20. The image forming system according to claim 16, wherein said image forming apparatus further includes a generation part that generates a composite image by combining said first image and said second image, and
said transmitting part transmits image data of said composite image to said external terminal as said display data for said remote operation screen,
wherein
said status display part has a plurality of notification parts for notifying that said image forming apparatus is brought into any one of a plurality of states, respectively, including at least one of a data reception state, a print operation state, and an attention state,
said second image has an image regarding said plurality of notification parts,
said transmitting part transmits said image data of said composite image generated by superimposing said second image in a nontransparent state on said first image to said external terminal when said image forming apparatus is brought into at least one of said plurality of states, and
said transmitting part transmits said image data of said composite image generated by superimposing said second image in a semitransparent state on said first image to said external terminal when said image forming apparatus is not brought into any one of said plurality of states.

21. The image forming system according to claim 16, wherein said image forming apparatus further includes a generation part that generates a composite image by combining said first image and said second image, and
said transmitting part transmits image data of said composite image to said external terminal as said display data for said remote operation screen,
wherein
said transmitting part transmits said image data of said composite image generated by superimposing said second image in a nontransparent state on said first image to said external terminal when said image forming apparatus is brought into a specific state, and
said transmitting part transmits said image data of said composite image generated by superimposing said second image in a semitransparent state on said first image to said external terminal when said image forming apparatus is not brought into said specific state.

22. The image forming system according to claim 21, wherein said specific state is at least one of a data reception state, a print operation state, and an attention state.

* * * * *